US007593422B2

(12) United States Patent
Shvodian

(10) Patent No.: US 7,593,422 B2
(45) Date of Patent: Sep. 22, 2009

(54) METHOD OF OPERATING A MEDIA ACCESS CONTROLLER HAVING PSEUDO-STATIC GUARANTEED TIME SLOTS

(75) Inventor: William M. Shvodian, McLean, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 1078 days.

(21) Appl. No.: 10/639,778

(22) Filed: Aug. 13, 2003

(65) Prior Publication Data

US 2004/0114563 A1 Jun. 17, 2004

Related U.S. Application Data

(63) Continuation-in-part of application No. 10/197,910, filed on Jul. 19, 2002, now Pat. No. 6,980,541.

(60) Provisional application No. 60/402,725, filed on Aug. 13, 2002, provisional application No. 60/344,051, filed on Jan. 3, 2002.

(51) Int. Cl.
*H04B 7/212* (2006.01)

(52) U.S. Cl. ...................................... 370/442; 370/336

(58) Field of Classification Search ................. 370/338, 370/321, 328, 329, 336, 442, 445, 447, 314; 455/41.2, 11.1
See application file for complete search history.

(56) References Cited

U.S. PATENT DOCUMENTS 5,719,859 A * 2/1998 Kobayashi et al. .......... 370/347
6,175,739 B1 * 1/2001 Ishii et al. ................ 455/452.1
6,230,014 B1 5/2001 Freeze et al.
6,324,180 B1 11/2001 Du
6,463,307 B1 * 10/2002 Larsson et al. .............. 455/574
6,970,422 B1 * 11/2005 Ho et al. ..................... 370/230
2003/0063619 A1 * 4/2003 Montano et al. ............ 370/443
2005/0190739 A1 * 9/2005 Sparrell et al. .............. 370/347

FOREIGN PATENT DOCUMENTS

EP 0 332 818 A 9/1989
EP 0 730 382 A 9/1996
WO WO 00 16504 A 3/2000
WO WO 00 59260 A 10/2000

* cited by examiner

*Primary Examiner*—Ricky Ngo
*Assistant Examiner*—Gary Mui

(57) ABSTRACT

A transmitter and a receiver are both initially assigned a starting time slot from a plurality of active time slots in a superframe structure. A controller sends instructions to the transmitter and receiver during a first superframe. These instruct the transmitter to transmit signals during an ending time slot in one or more unused time intervals in the superframes. If the transmitter receives these instructions, it immediately begins transmitting in the ending time slot. If the receiver receives the instructions, it listens for the signals during both the starting active time slot and the ending active time slot for a set number of consecutive superframes after the first superframe. If the receiver does not receive the instructions, it listens for the signals during the entire superframe until it hears instructions in a new superframe. If the transmitter misses more than the set number of superframes, it stops transmitting.

22 Claims, 19 Drawing Sheets

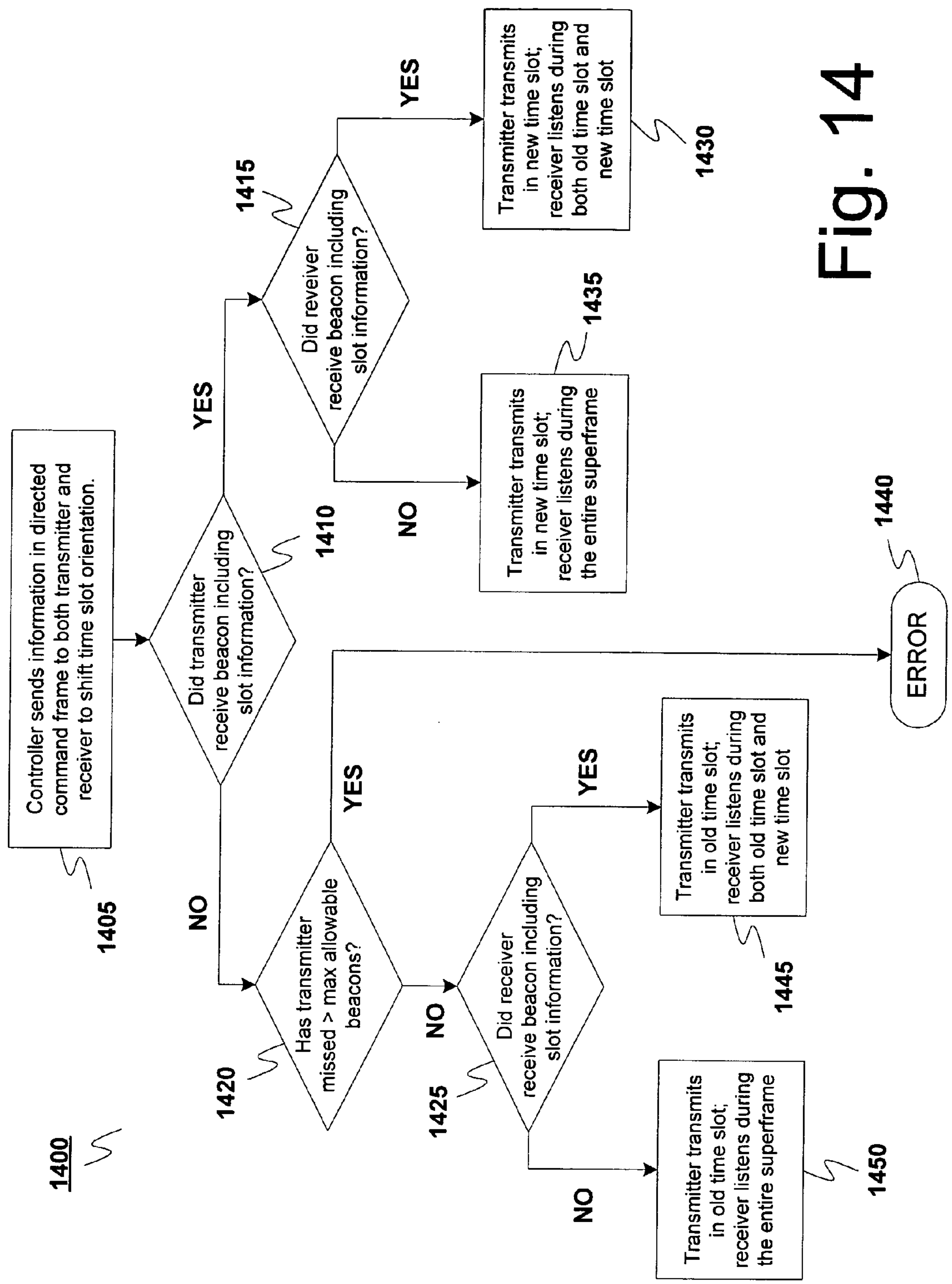
1400
Controller sends information in directed command frame to both transmitter and receiver to shift time slot orientation.
1405
Did transmitter receive beacon including slot information?
1410
YES
NO
Did reveiver receive beacon including slot information?
1415
YES
Transmitter transmits in new time slot; receiver listens during both old time slot and new time slot
1430
NO
Transmitter transmits in new time slot; receiver listens during the entire superframe
1435
Has transmitter missed > max allowable beacons?
1420
YES
ERROR
1440
NO
Did receiver receive beacon including slot information?
1425
YES
Transmitter transmits in old time slot; receiver listens during both old time slot and new time slot
1445
NO
Transmitter transmits in old time slot; receiver listens during the entire superframe
1450
Fig. 14

METHOD OF OPERATING A MEDIA ACCESS CONTROLLER HAVING PSEUDO-STATIC GUARANTEED TIME SLOTS

CROSS-REFERENCE TO RELATED PATENT DOCUMENTS

This application is a continuation-in-part of U.S. application Ser. No. 10/197,910, filed Jul. 19, 2002 now U.S. Pat. No. 6,980,541, entitled "MEDIA ACCESS CONTROLLER HAVING PSEUDO-STATIC GUARANTEED TIME SLOTS," by William M. Shvodian, which relies for priority on U.S. provisional application Ser. No. 60/344,051, by William M. Shvodian, filed Jan. 3, 2002, entitled "PSEUDO-STATIC SLOTS FOR WPAN TDMA/TDD," the contents of each of which are hereby incorporated by reference in their entirety. This application also relies for priority on U.S. provisional application Ser. No. 60/402,725, by William M. Shvodian, filed Aug. 13, 2002, entitled "METHOD OF OPERATION OF A WIRELESS AREA NETWORK," the contents of which are hereby incorporated by reference in its entirety.

BACKGROUND OF THE INVENTION

The present invention relates to wireless personal area networks and wireless local area networks. More particularly, the present invention relates to systems, methods, devices, and computer program products for controlling transmitted power and transmission rate in a wireless personal area network or wireless local area network environment.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY Layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

FIG. 3 is a block diagram of a wireless network 300 that could use the IEEE 802.15 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a controller (i.e., it functions as a master) while the other devices follow the instructions of the controller (i.e., they function as slaves). The controller can be a designated device, or simply one of the devices chosen to function as a controller. One primary difference between devices and the controller is that the controller must be able to communicate with all of the devices in the network, while the various devices need not be able to communicate with all of the other devices.

As shown in FIG. 3, the network 300 includes a controller 310 and a plurality of devices 321-325. The controller 310 serves to control the operation of the network 300. As noted above, the system of controller 310 and devices 321-325 may be called a piconet, in which case the controller 310 may be referred to as a piconet controller (PNC). Each of the devices 321-325 must be connected to the controller 310 via primary wireless links 330, and may also be connected to one or more other devices 321-325 via secondary wireless links 340. Each device 321-325 of the network 300 may be a different wireless device, for example, a digital still camera, a digital video camera, a personal data assistant (PDA), a digital music player, or other personal wireless device.

In some embodiments the controller 310 may be the same sort of device as any of the devices 321-325, except with the additional functionality for controlling the system and the requirement that it communicate with every device 321-325 in the network 300. In other embodiments the controller 310 may be a separate designated control device.

The various devices 321-325 are confined to a usable physical area 350, which is set based on the extent to which the controller 310 can successfully communicate with each of the devices 321-325. Any device 321-325 that is able to communicate with the controller 310 (and vice versa) is within the usable area 350 of the network 300. As noted, however, it is not necessary for every device 321-325 in the network 300 to communicate with every other device 321-325.

FIG. 4 is a block diagram of a controller 310 or a device 321-325 from the network 300 of FIG. 3. As shown in FIG. 4, each controller 310 or device 321-325 includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 205 include the functionality of the device 321-325. These upper layers 430 may include TCP/IP, TCP, UDP, RTP, IP, LLC, or the like.

Typically, the controller 310 and the devices 321-325 in a WPAN share the same bandwidth. Accordingly, the controller 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using time division multiple access (TDMA). Using this standard, the MAC layer 420 defines frames and superframes through which the sharing of the bandwidth by the devices 321-325 is managed by the controller 310 and/or the devices 321-325.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

FIG. 5 illustrates a data transmission scheme 500 in which information is transmitted through a network 300 including a plurality of MAC superframes 505 each including guaranteed time slots (GTSs), according to a preferred embodiment of the present invention. Preferably the superframes 505 are of a set length to allow various devices in the network to coordinate with a network controller or other devices in the network. In alternate embodiments these GTSs may be referred to by the term channel time allocations (CTAs).

As shown in FIG. 5, the data transmission scheme 500 includes transmitting successive superframes 505 in time across the network 300. Each superframe 505 includes a beacon 510, an optional contention access period (CAP) 515, and a contention free period (CFP) 520. The contention free period 520 may include one or more management time slots (MTSs) 525 and one or more guaranteed time slots (GTSs) 530.

The superframe 505 itself is a fixed time construct that is repeated in time. The specific duration of the superframe 505 is described in the beacon 510. In actuality the beacon 510 includes information regarding how often the beacon 510 is repeated, which effectively corresponds to the duration of the superframe 505. The beacon 510 also contains information regarding the network 300, such as the identity of the transmitter and receiver of each slot, and the identity of the controller 310.

In the preferred embodiment there are as many guaranteed time slots 530 as there are primary and secondary wireless links 330 and 340. However, this may change in alternate embodiments. There may be greater or fewer guaranteed time slots 530 than there are devices 321-325. In this case the controller 310 will designate how the devices 321-325 should use the available guaranteed time slots 530.

The controller 310 uses the beacon 515 to coordinate the scheduling of the individual devices 321-325 into their respective guaranteed time slots 530. All devices 321-325 listen to the controller 310 during the beacon period 510. Each device 321-325 will receive zero or more guaranteed time slots 530, being notified of each start time and duration from the controller 310 during the beacon period 510. Channel time allocation (CTA) fields in the beacon 510 include start times, packet duration, source device ID, destination device ID, and a stream index. This beacon information uses what is often called TLV format, which stands for type, length, and value. As a result, each device knows when to transmit and when to receive. In all other times the device 321-325 may cease listening and go into a power conservation mode. The beacon period 510, therefore, is used to coordinate the transmitting and receiving of the devices 321-325.

The controller 310 sends the beacon 510 to all of the devices 321-325 at the beginning of each superframe 505. The beacon 510 tells each device 321-325 the duration or superframe 505 as well as other information about its MAC address, e.g., the size and duration of the contention access period 515, if that is used, and the duration of the contention free period 520.

Each beacon will contain information that is not precisely a CTA. One piece of information will define the beacon period 510 and describe the start time and the duration for the beacon period 510. Another will define the contention access period 515 and describe the start time and the duration for the contention access period 515. Each beacon can also have multiple CTAs. There will be a CTA for each of the management time slots 525 and guaranteed time slots 530. Using dynamic time slots, the slot assignments can change every superframe with modified CTAs.

During transmission, each device 321-325 must hear the beacon 510 so that it will know what time slots have been assigned to it as either a transmitter or receiver. If the device misses the beacon, it must listen to the entire superframe just in case it is receiving data. Furthermore, it cannot transmit for the duration of the superframe because it does not know when it is permitted to transmit. This is detrimental to the system because it leads to interruptions in data transmission.

The network can pass control and administrative information between the controller 310 and the various devices 321-325 through the optional contention access period 515, the management time slots 525, or both. For example, this can involve information about new devices that want to join the network 300. The particular implementation will determine what particular option is used: it could include a contention access period 515, one or more management time slots 525, or some combination of both.

Management time slots 525 can be downlink time slots in which information is sent from the controller 310 to the devices 321-325, or uplink time slots in which information is sent from the devices 321-325 to the controller 310. In this preferred embodiment two management time slots 525 are used per superframe, one uplink and one downlink, though alternate embodiments could choose different numbers of management time slots and mixtures of uplink and downlink.

If a new device 321-325 desires to be added to the network 300, it requests entry from the controller 310 either in the optional contention access period 330 or in one of the management time slots 525. If a particular device 321-325 has no need to coordinate with the controller 310 during the optional contention access period 515 or the management time slots 525, that device 321-325 may remain silent during the optional contention access period 515 or the management time slots 525. In this case that device 321-325 need not even listen to the controller 310 during the optional contention access period 515 or the management time slots 525, and may go into a power-conserving “sleep” mode.

Individual devices then transmit data packets during the contention free period 340. The devices 321-325 use the guaranteed time slots 530 assigned to them to transmit data packets 535 to other devices (which may include the controller 310 if the controller 310 is also a device 321-325 within the network 300). Each device 321-325 may send one or more packets of data 535, and may request an immediate acknowledgement (ACK) frame 540 from the recipient device 321-325 indicating that the packet was successfully received, or may request a delayed (grouped) acknowledgement. If an immediate ACK frame 540 is requested, the transmitting device 321-325 should allocate sufficient time in the guaranteed time slot 530 to allow for the ACK frame 540 to arrive.

It is necessary to organize which devices 321-325 will be transmitting and which will be listening to avoid collisions of transmitted data. For example if device one 321 and device four 324 both try and transmit data at the same time, this data may collide and cause the receiving devices to fail in acquiring and receiving the signal.

The reason we allocate individual time slots 530 in the superframe 505 is because when a given device, e.g., device one 321, is transmitting to another device, e.g., device five 325, it's really broadcasting its signal to everyone, i.e., broadcasting on the open air where anyone who happens to be listening can hear. We would prefer that while device one 321 was transmitting, device five 325 was the only device that was listening. This is basically a TDMA approach. Since the broadcast medium is wireless, when one device is transmitting the system has to limit who else can use the channel.

Since each particular device 321-325 knows its transmit start time and duration from information received during the beacon period 510, each device 321-325 can remain silent until it is its turn to transmit. Moreover, a given device 321-325 need not listen during any guaranteed time slot periods 530 in which it is not assigned to either transmit or receive, and may enter into a power conservation mode. Since the time periods corresponding to each guaranteed time slot 530 have been fully coordinated by the controller 310 during the beacon period 510, individual devices 321-325 know when not to listen.

The guaranteed time slots 530 shown in this embodiment may be of differing sizes. The starting times and durations of the guaranteed time slots 530 are determined by the controller 310 and sent to the devices 321-325 during the contention access period 330 or one of the management time slots 525, as implemented.

In this embodiment a guaranteed time slot 530 is shown as having a plurality of data packets 535 and associated ACK frames 540. Generally there is also a delay period 545 between the data packets 535 and ACK frames 540, and between a final acknowledgement 540 and the end of the guaranteed time slot 530.

Each one of these data packets 535 will preferably have a source device ID (e.g. address) and a destination device ID (e.g. address). Thus, each individual packet will have its own identifier.

This can lead to problems if a device 321-325 misses the beacon 510. First, a device 321-325 that misses the beacon 510 will have to listen for the entire duration of the superframe 505 in case another device 321-325 is transmitting to it. This eliminates any chance for the device 321-325 to go into a low power mode. Second, a device 321-325 that misses the beacon 510 cannot transmit during the entire duration of the superframe 505, even if it was assigned a GTS 530, because it won't know when that assigned slot 530 is.

In embodiments without a CAP 515 or an MTS 525, it may be desirable to put in a delay between the beacon 510 and the first GTS 530, to allow individual devices 321-325 time to process the beacon 510. Otherwise the devices 321-325 assigned to the first GTS 530 may not enter into a transmission/listening mode in time to use the assigned slot 530.

It may also be desirable to make certain that the first GTS 530 is available for use by low power devices so that they can listen to the beacon 510, listen to their assigned GTS 530 and they go to sleep right away.

A problem with this system, however, is that it can lead to significant transmission errors if the devices 321-325 cannot properly receive the beacons 510. If the time slots 530 are totally dynamic, each device 321-325 must properly receive a beacon 510 for every superframe 505 or suffer the disadvantages listed above. This could lead to a dead air rate proportional to the beacon rate. A beacon error rate of $10^{-4}$ would correspond to average of an interruption once per minute. Such an error rate would be unacceptable for many applications, and would require additional buffering to make up for the losses, which would serve to increase the cost of the device 321-325.

However, if a device 321-325 has the timing information for the superframe 505, but just didn't get the new slot assignments, i.e., it only partially received the header, it will have the use of timing information but not the use of slot assignment information. Or, since there is a maximum amount of drift between devices 321-325 and the controller 310, a device 321-325 can transmit if it knows the CTAs, even if it completely misses the beacon, for up to some finite number of beacons. This can lead to a tenfold improvement in error rate, or from roughly once a minute to once every ten minutes. This shows that there can be significant improvement by having the slot assignment stay the same.

It is possible to use this fact advantageously if the system uses static GTSs 530, i.e., GTSs that don't change in location or duration. In this case, since each device knows where and when the GTSs 530 are, and who was assigned to them in the last superframe 505, all that is lost is the knowledge of whether the assignment of devices 321-325 to the time slots 530 has been changed.

Thus, if devices 321-325 fail only if they miss successive beacons 510, e.g., if they miss two in a row, three in a row, etc., the system can dramatically improve the time between transmission stoppages due to corrupt headers 510. So by allowing more and more header errors, the system can greatly reduce the probability that it will not be able to transmit.

A problem with using static GTSs 530 is that the assigned time slots 530 can become poorly allocated. This can cause a loss in transmission speed because of wasted time, and may make it difficult to accommodate adjacent networks that may need time allocated in larger durations.

Furthermore, if two networks are set up side-by-side, it becomes necessary to coordinate the two networks so that they don't interfere with each other, but each also has its bandwidth requirements met.

SUMMARY OF THE INVENTION

Consistent with the title of this section, only a brief description of selected features of the present invention is now presented. A more complete description of the present invention is the subject of this entire document.

An object of the present invention is to provide a way of accommodating two overlapping wireless networks without transmissions from the networks colliding with each other.

Another object of the present invention is to provide a way of adjusting pseudo-static time slots for active devices without interrupting the flow of information between the active devices, and without increasing the chance of the active devices losing their coordination with each other.

Another feature of the present invention is to address the above-identified and other deficiencies of conventional communications systems and methods.

Yet another feature of the present invention is to provide a method of adjusting pseudo-static time slots with a minimum of acknowledgement packets required.

Some of these objects are accomplished by way of a method of controlling a transmitter and a receiver to adjust transmitting and receiving times in a superframe having a plurality of active time slots and one or more unused time intervals, the transmitter and the receiver both being initially assigned to a starting active time slot chosen from the plurality of active time slots, comprising: sending a first instruction from a controller to the receiver to listen for signals from the transmitter during both the starting active time slot and a target unused time interval chosen from the one or more unused time intervals, the starting active time slot and the target unused time interval being adjacent to each other; sending a first acknowledgement from the receiver to the controller that the first instruction was received and acted upon; sending a second instruction from a controller to the transmitter, after the controller receives the first acknowledgement, to transmit signals to the receiver during an ending active time slot, the ending active time slot being placed in a time period that is entirely contained within one or both of the starting active time slot and the target unused time interval; sending a second acknowledgement from the transmitter to the controller that the first instruction was received and acted upon; sending a third instruction from a controller to the receiver, after the controller receives the second acknowledgement, to listen for signals from the transmitter during only the ending active time slot; and sending a third acknowledgement from the receiver to the controller that the first instruction was received and acted upon. The transmission time of the transmitter is preferably not changed between the sending of the first instruction and the sending of the second instruction.

The method may further comprise repeating the sending of the first instruction before receiving the first acknowledgement, repeating the sending of the second instruction before receiving the second acknowledgement, or repeating the sending of the third instruction before receiving the third acknowledgement.

The first and third instructions may be sent to the receiver in a beacon, and the second instruction may be sent to the transmitter in a directed command frame. The target unused time interval is preferably smaller than the starting active time slot.

The transmitter and the receiver may be in a different network than the controller.

Some of these objects are also accomplished by way of a method of controlling a transmitter and a receiver to adjust transmitting and receiving times in a superframe having a plurality of active time slots and one or more unused time intervals, the transmitter and the receiver both being initially assigned to a starting active time slot chosen from the plurality of active time slots, comprising: sending a first instruction from a controller to the receiver to listen for signals from the transmitter during both the starting active time slot and an ending active time slot, the ending active time slot being formed in a target unused time interval chosen from the one or more unused time intervals; sending a first acknowledgement from the receiver to the controller that the first instruction was received and acted upon; sending a second instruction from a controller to the transmitter, after the controller receives the first acknowledgement, to transmit signals to the receiver during the ending active time slot; sending a second acknowledgement from the transmitter to the controller that the first instruction was received and acted upon; sending a third instruction from a controller to the receiver, after the controller receives the second acknowledgement, to listen for signals from the transmitter during only the ending active time slot; and sending a third acknowledgement from the receiver to the controller that the first instruction was received and acted upon. The transmission time of the transmitter is preferably not changed between the sending of the first instruction and the sending of the second instruction, and the target unused time interval is preferably at least as long in duration as the starting active time slot.

The method may further comprise repeating the sending of the first instruction before receiving the first acknowledgement, repeating the sending of the second instruction before receiving the second acknowledgement, or repeating the sending of the third instruction before receiving the third acknowledgement.

The first and third instructions may be sent to the receiver in a beacon, and the second instructions may be sent to the transmitter in a directed command frame. The target unused time interval may be separated from the starting active time slot by a set period of time. The transmitter and the receiver may be in a different network than the controller.

Some of these objects may also be accomplished by way of a method of coordinating transmission times within overlapping first and second wireless networks, comprising: dividing available transmission time into a plurality of superframes, each superframe being of a set duration; dividing each superframe into a plurality of primary time slots, including one or more initial primary time slots and one or more additional primary time slots; assigning the one or more initial primary time slots to one or more primary devices within the first wireless network; dividing each of the one or more additional primary time slots into one or more secondary time slots; and assigning the one or more secondary time slots to one or more secondary devices within the second wireless network.

The one or more initial primary time slots are preferably assigned by a primary controller, and the one or more secondary time slots are preferably assigned by a secondary controller. The primary controller is preferably in the first wireless network, and the secondary controller is preferably in the secondary wireless network.

The primary time slots may have the same duration, or they may have differing durations.

Some of these objects may also be accomplished by way of a method of controlling a transmitter and a receiver to adjust transmitting and receiving times in a superframe having a plurality of active time slots and one or more unused time intervals, the transmitter and the receiver both being initially assigned to a starting active time slot chosen from the plurality of active time slots, comprising: sending a first instruction from a controller to the receiver to listen for signals from the transmitter during both the starting active time slot and a target unused time interval chosen from the one or more unused time intervals, the starting active time slot and the target unused time interval being adjacent to each other; sending a second instruction from a controller to the transmitter, after the controller sends the first instruction, to transmit signals to the receiver during an ending active time slot, the ending active time slot being placed in a time period that is entirely contained within one or both of the starting active time slot and the target unused time interval; sending an acknowledgement from the transmitter to the controller that the first instruction was received and acted upon; and sending a third instruction from a controller to the receiver, after the controller receives the acknowledgement, to listen for signals from the transmitter during only the ending active time slot. The transmission time of the transmitter is preferably not changed between the sending of the first instruction and the sending of the second instruction.

The first instruction is preferably sent in a beacon; the second instruction is preferably sent in a directed command frame; and the third instruction is preferably sent in a beacon. Preferably the receiver does not acknowledge receipt of the first instruction to the controller, or acknowledge receipt of the third instruction to the controller.

Some of these objects may also be accomplished by way of a method of controlling a transmitter and a receiver to adjust transmitting and receiving times in a superframe having a plurality of active time slots and one or more unused time intervals, the transmitter and the receiver both being initially assigned to a starting active time slot chosen from the plurality of active time slots, comprising: sending a first instruction from a controller to the receiver to listen for signals from the transmitter during both the starting active time slot and an ending active time slot, the ending active time slot being formed in a target unused time interval chosen from the one or more unused time intervals; sending a second instruction from a controller to the transmitter, after the controller sends the first instruction, to transmit signals to the receiver during the ending active time slot; sending an acknowledgement from the transmitter to the controller that the first instruction was received and acted upon; and sending a third instruction from a controller to the receiver, after the controller receives the acknowledgement, to listen for signals from the transmitter during only the ending active time slot. The transmission time of the transmitter is preferably not changed between the sending of the first instruction and the sending of the second instruction, and the target unused time interval is preferably at least as long in duration as the starting active time slot.

The first instruction is preferably sent in a beacon; the second instruction is preferably sent in a directed command frame; and the third instruction is preferably sent in a beacon.

Preferably the receiver does not acknowledge receipt of the first instruction to the controller, or acknowledge receipt of the third instruction to the controller.

A method is also provided of controlling a transmitter and a receiver to adjust transmitting and receiving times in superframes having a plurality of active time slots and one or more unused time intervals, the transmitter and the receiver both being initially assigned to a starting time slot chosen from the plurality of active time slots. This method comprises: sending instructions from a controller to both the transmitter and the receiver during a first superframe, the instructions instructing the transmitter to transmit signals during an ending time slot formed in the one or more unused time intervals; receiving the instructions at the receiver during the first superframe; and listening for the signals at the receiver during both the starting active time slot and the ending active time slot during n consecutive superframes after the first superframe. In this case, n is preferably an integer greater than zero.

The method may further comprise transmitting the signals from the transmitter during the starting time slot during at least one of the n consecutive superframes.

The method may further comprise: receiving the instructions at the transmitter during one of the n consecutive superframes; and transmitting the signals from the transmitter during the ending time slot in at least one of the n consecutive superframes.

The method may further comprise: receiving the instructions at the transmitter during the first superframe; and transmitting the signals from the transmitter during the ending time slot in each of the n consecutive superframes.

The method may further comprise listening for the signals at the receiver during the ending active time slot during all later superframes after the n consecutive superframes.

The instructions may be placed inside of a beacon within the first superframe.

The method may further comprise sending the instructions from the controller to both the transmitter and the receiver in each of the n consecutive superframes. In this case, the instructions may be placed inside of n respective beacons within the n consecutive superframes.

The transmitter and receiver may be ultrawide bandwidth devices.

The value of n is preferably between 1 and 8, and is most preferably 4.

A method is also provided of controlling a transmitter and a receiver to adjust transmitting and receiving times in superframes having a plurality of active time slots and one or more unused time intervals, the transmitter and the receiver both being initially assigned to a starting time slot chosen from the plurality of active time slots. The method comprises: sending instructions from a controller to both the transmitter and the receiver during a first superframe, the instructions instructing the transmitter to transmit signals during an ending time slot formed in the one or more unused time intervals; receiving the instructions at the transmitter during the first superframe; transmitting the signals from the transmitter during the ending time slot in n consecutive superframes after the first superframe; and listening for the signals at the receiver during all of the active time slots and unused time intervals during at least one of the n consecutive superframes. In this case, n is preferably an integer greater than zero.

The method may further comprise: receiving the instructions at the receiver during one of the n consecutive superframes; and listening for the signals at the receiver during both the starting active time slot and the ending active time slot during at least one of the n consecutive superframes after the first superframe.

The transmitter and receiver may be ultrawide bandwidth devices.

A method is also provided of controlling a receiver in a wireless network using superframes having a plurality of active time slots and one or more unused time intervals, the receiver being initially assigned to a starting time slot chosen from the plurality of active time slots. The method comprises: receiving instructions from a controller at the receiver in a first superframe, the instructions instructing the receiver to receive signals during an ending time slot formed in the one or more unused time intervals; and listening for the signals at the receiver during both the starting time slot and the ending time slot during n consecutive superframes after the first superframe. In this case, n is preferably an integer greater than zero. More preferably n is between 1 and 8, and is most preferably 4.

A method is also provided of controlling a transmitter in a wireless network using superframes having a plurality of active time slots and one or more unused time intervals, the transmitter being initially assigned to a starting time slot chosen from the plurality of active time slots. This method comprises: determining whether the transmitter received instructions from a controller in a first superframe, the instructions instructing the transmitter to transmit signals during an ending time slot; transmitting the signals during the ending time slot if the transmitter did receive the instructions in the first superframe; and transmitting the signals during the starting time slot if the transmitter did not receive the instructions in the first superframe, and if the transmitter has not missed receiving previous instructions in m consecutive immediately previous superframes. In this case m is preferably an integer greater than or equal to zero.

The method may further comprise entering an error mode if the transmitter did not receive the instructions in the first superframe, and if the transmitter has missed receiving previous instructions in m consecutive immediately previous superframes.

The ending time slot may be formed in the one or more unused time intervals, or it may be the same as the starting time slot.

The value for m is preferably between 0 and 7, and is most preferably 3.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings. In these drawings like reference numerals designate identical or corresponding parts throughout the several views.

FIG. 14 is a flow chart showing the operation of a transmitting and receiving device according to a preferred embodiment of the present invention.

DETAILED DESCRIPTION OF THE PREFERRED EMBODIMENTS

As shown above, static time slots allow for certain advantages, but incur certain disadvantages. Primarily they prevent the interruptions in the data transmission stream because of corrupt beacons 510, but at a cost of slot assignment flexibility. Applicants will discuss below several alternative embodiments using static slots and pseudo-static slots.

Overlapping Networks Using Static Slots

Applicants present an additional implementation for static time slots—sharing of available air transmission time in overlapping networks. Consider the situation where two networks are located such that their transmission area overlaps. For example, a user may have one network in one part of his house and another network in another part of his house. These networks may overlap in part or in whole with each other's transmission area. Regardless, where they overlap, there is a potential for collisions and interference.

Figure 1:
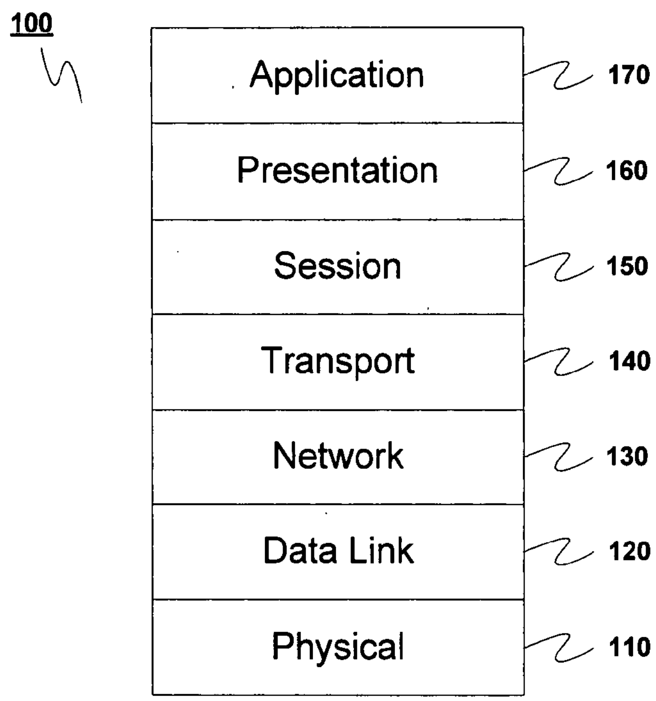
FIG. 1 is a block diagram of the OSI standard for a computer communication architecture.
Figure 2:
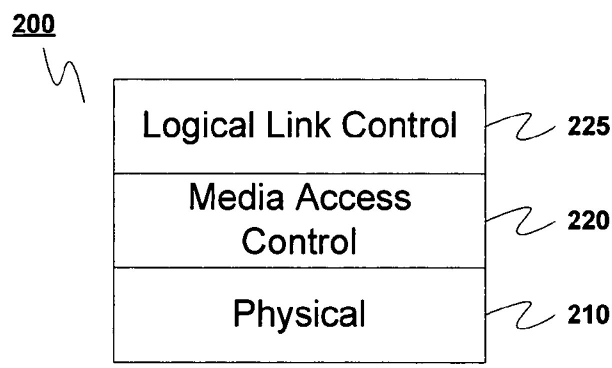
FIG. 2 is a block diagram of the IEEE 802 standard for a computer communication architecture.
Figure 3:
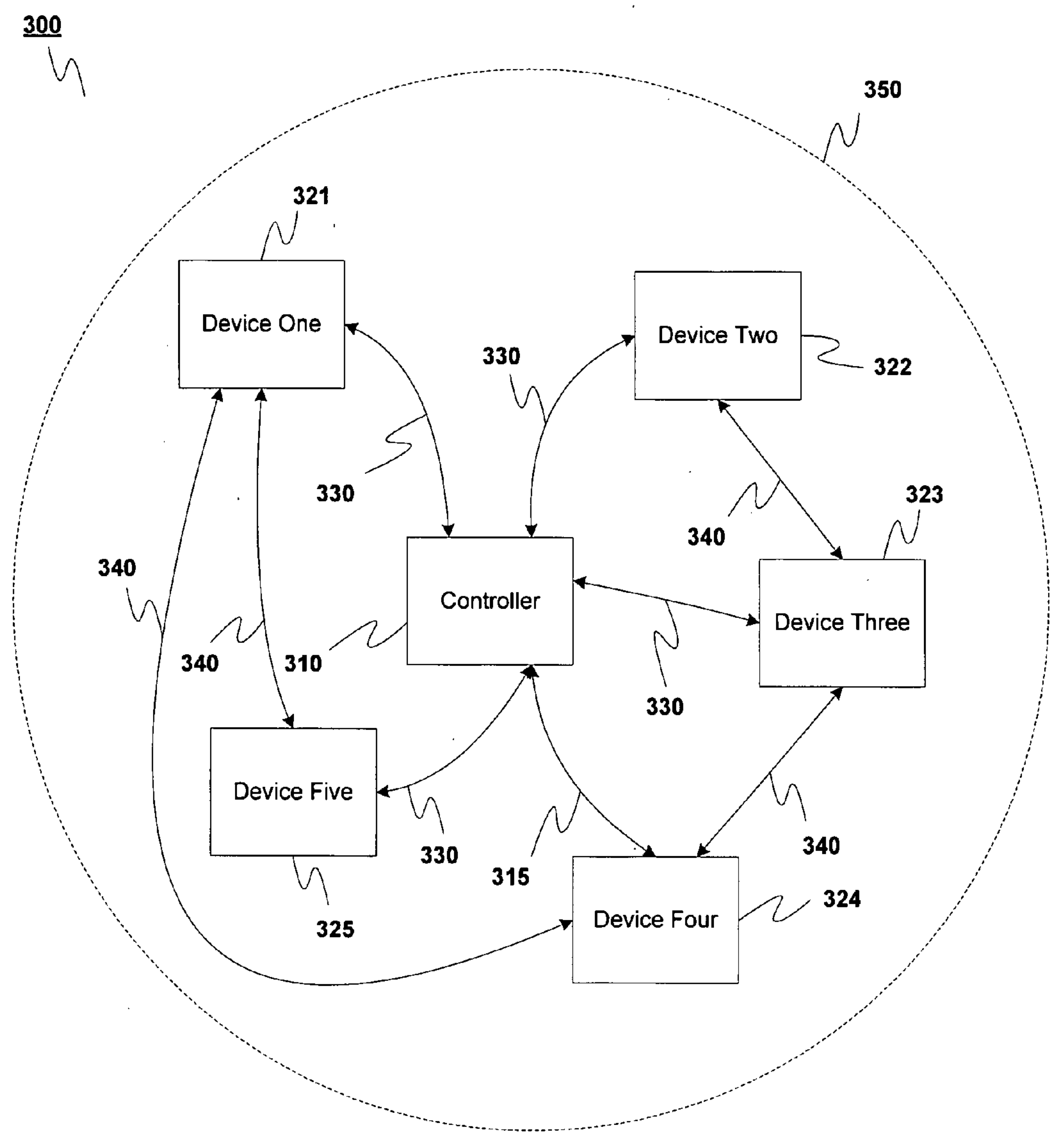
FIG. 3 is a block diagram of a wireless network.
Figure 4:
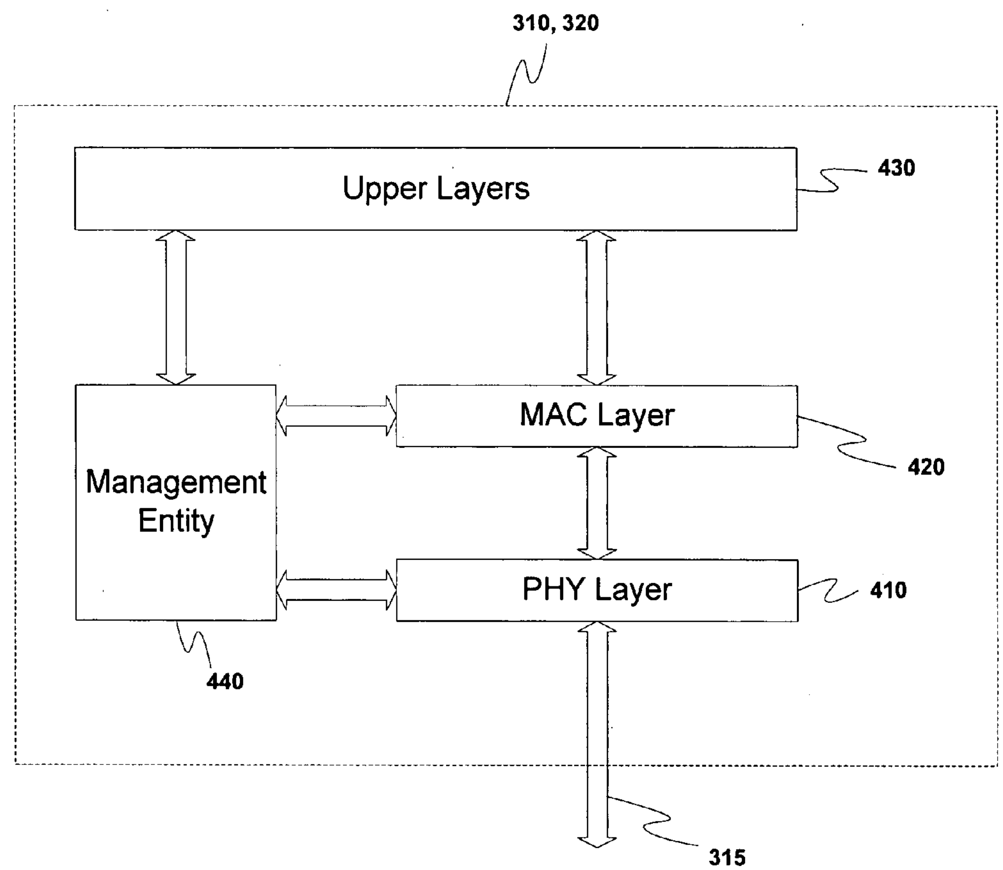
FIG. 4 is a block diagram of a device or controller in the wireless network of FIG. 3.
Figure 5:
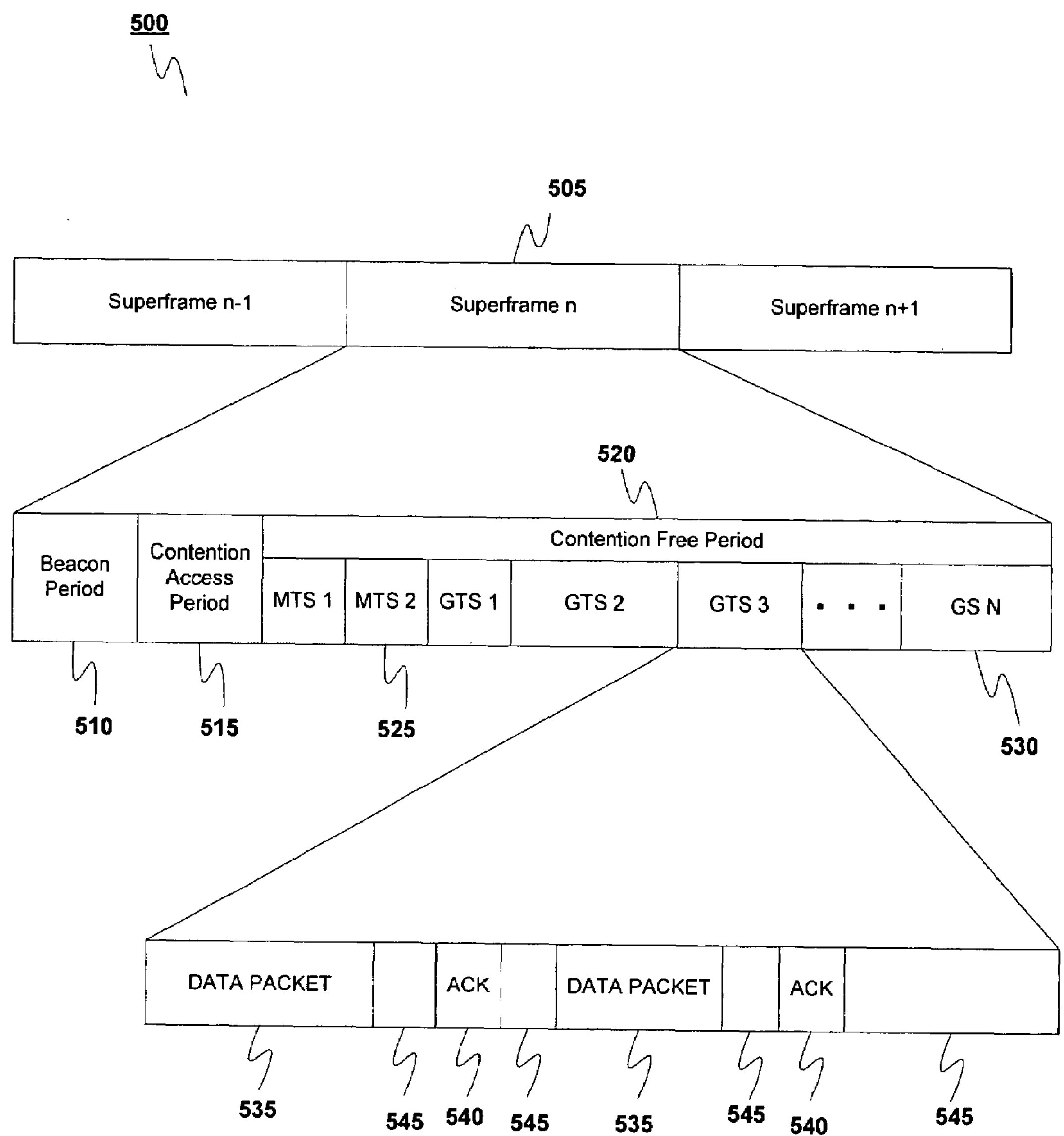
FIG. 5 illustrates an exemplary structure of a series of superframes having guaranteed time slots during the contention free period according to a preferred embodiment of the present invention.
Figure 6:
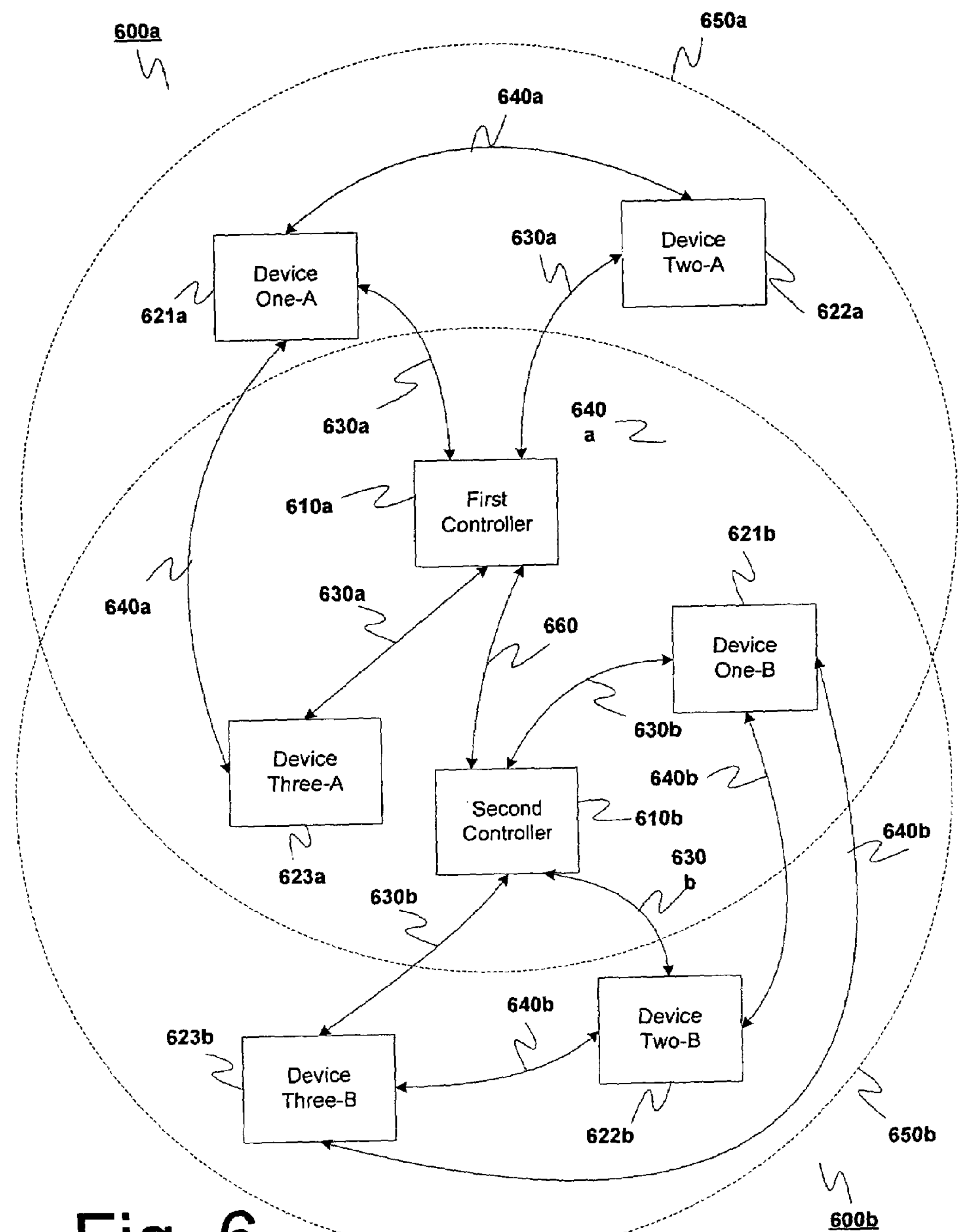
FIG. 6 is a block diagram of two overlapping wireless networks.

FIG. 6 is a block diagram of two overlapping wireless networks. As shown in FIG. 6, the networks 600*a*, 600*b* each include a controller 610*a*, 610*b* and a plurality of devices 621*a*-623*a*, 621*b*-623*b*. The controllers 610*a*, 610*b* serve to control the operation of the respective network 600*a*, 600*b*. As noted above, the system of controller 610*a*, 610*b* and devices 621*a*-623*a*, 621*b*-623*b* may be called a piconet, in which case the controller 610*a*, 610*b* may be referred to as a piconet controller (PNC).

Each of the devices 621*a*-623*a*, 621*b*-623*b* must be connected to its controller 610*a*, 610*b* via primary wireless links 630*a*, 630*b*, and may also be connected to one or more other devices 621*a*-623*a*, 621*b*-623*b* via secondary wireless links 640*a*, 640*b*. Each device 621*a*-623*a*, 621*b*-623*b* within a network 600*a*, 600*b* may be a different wireless device, for example, a digital still camera, a digital video camera, a personal data assistant (PDA), a digital music player, or other personal wireless device.

In some embodiments the controllers 610*a*, 610*b* may be the same sort of device as any of the devices 621*a*-623*a*, 621*b*-623*b*, except with the additional functionality for controlling the system and the requirement that it communicate with every device 621*a*-623*a*, 621*b*-623*b* in the respective network 600*a*, 600*b*. In other embodiments the controllers 610*a*, 610*b* may be a separate designated control device.

The various devices 621*a*-623*a*, 621*b*-623*b* are confined to a usable physical area 650*a*, 650*b*, which is set based on the extent to which the controllers 610*a*, 610*b* can successfully communicate with each of the devices 621*a*-623*a*, 621*b*-623*b*. Any device 621*a*-623*a*, 621*b*-623*b* that is able to communicate with its controller 610*a*, 610*b* (and vice versa) is within the usable area 650*a*, 650*b* of the respective network 600*a*, 600*b*. As noted, however, it is not necessary for every device 621*a*-623*a*, 621*b*-623*b* in a network 600*a*, 600*b* to communicate with every other device 621*a*-623*a*, 621*b*-623*b*.

In order to coordinate between the two networks 600*a*, 600*b*, it is also necessary for the first controller 600*a* to be within the second usable area 650*b* of the second controller 600*b*, and for the second controller 600*b* to be within the first usable area 650*a* of the first controller 600*a*. In applicant's preferred embodiment, the first and second controllers 610*a* and 610*b* communicate with each other via an inter-network wireless link 660.

The two networks 600*a*, 600*b* avoid collisions by operating together under the ultimate control of one of the controllers 610*a*, 610*b*. For the purposes of this embodiment, the first controller 610*a* is the primary controller and the second controller 610*b* is the secondary controller. The primary controller 610*a* assigns time slots 530 to both devices 621*a*-625*a* in the first network 600*a* and to the second network 600*b*. But the second controller 610*b* controls how the devices 621*b*-625*b* in the second network 600*b* use the allotted time slots 530.

The second controller 610*b* accomplishes this by treating the time slot 530 assigned by the first controller 610*a* as a superframe of its own. During this secondary superframe, the second controller 610*b* may use that whole slot for its traffic, subdividing it up into time slots of its own. In this way the controllers 610*a*, 610*b* of each network 600*a*, 600*b* share the channels between them. Exactly how the airtime will be divided depends upon negotiations between the two controllers 610*a*, 610*b*.

Figure 7:
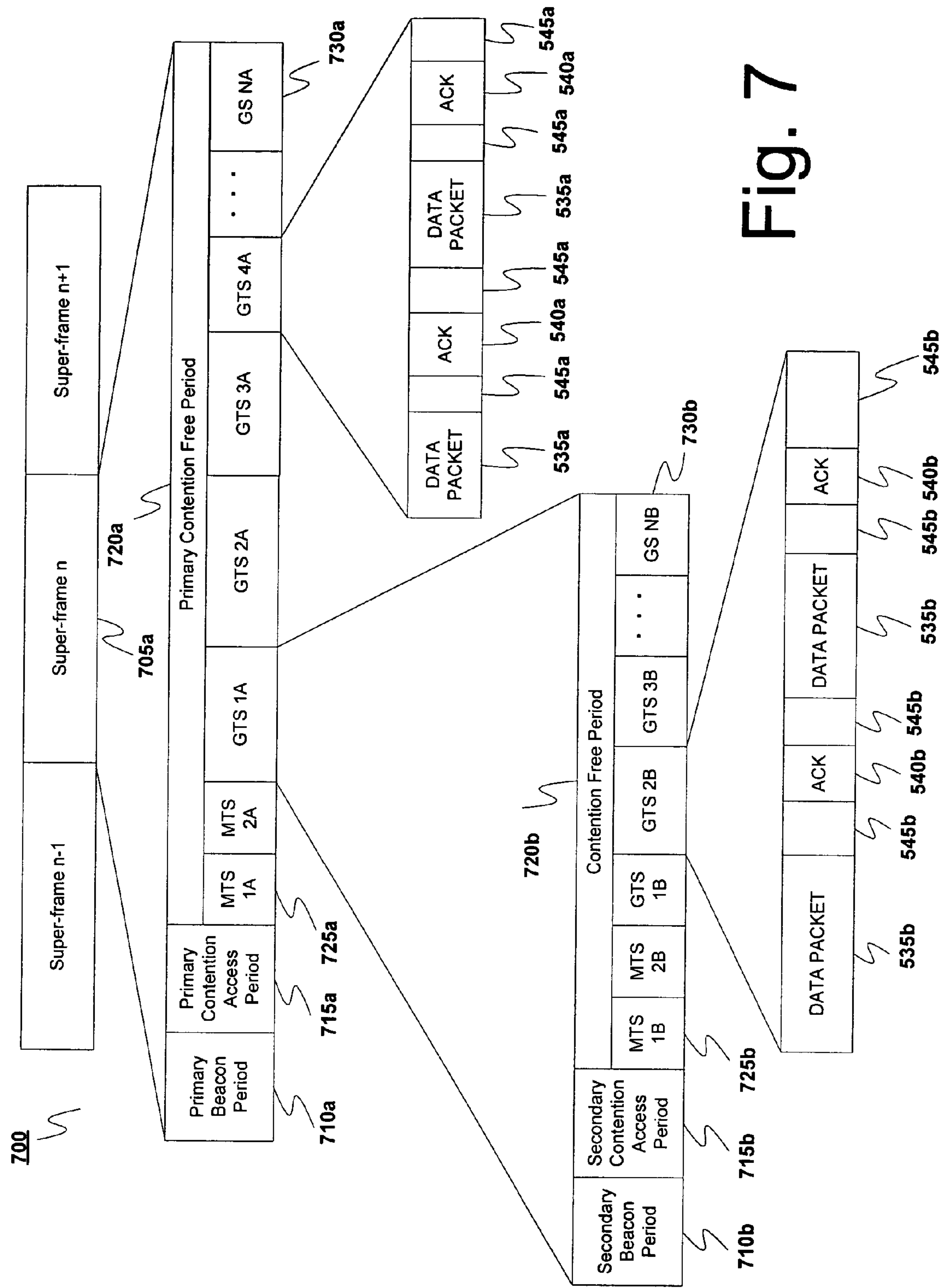
FIG. 7 illustrates an exemplary structure of a series of superframes having guaranteed time slots during the contention free period according to a preferred embodiment of the present invention in which a secondary superframe is included in one guaranteed time slot.

FIG. 7 illustrates an exemplary structure of a series of superframes having guaranteed time slots during the contention free period according to an embodiment of the present invention in which a secondary superframe is included in one guaranteed time slot.

As shown in FIG. 7, the data transmission scheme 700 includes transmitting successive primary superframes 705*a* in time through the network 600*a*, and to the second controller 610*b*.

Each primary superframe 705*a* includes a primary beacon 710*a*, an optional primary contention access period (CAP) 715*a*, and a primary contention free period (CFP) 720*a*. The primary contention free period 720*a* may include one or more primary management time slots (MTSs) 725*a* and one or more primary guaranteed time slots (GTSs) 730*a*.

The primary superframe 705*a* itself is a fixed time construct that is repeated in time. The specific duration of the primary superframe 705*a* is described in the primary beacon 710*a*. In actuality the primary beacon 710*a* includes information regarding how often the primary beacon 710*a* is repeated, which effectively corresponds to the duration of the primary superframe 705*a*. The primary beacon 710*a* also contains information regarding the first network 600*a*, such as the MAC address of transmissions and the identity of the first controller 610*a*.

The second network 600*b* may be assigned one or more GTSs 730*a* within each primary superframe 705. The second network can then use these time slots 730*a* as secondary superframes 705*b*.

Each secondary superframe 705*b* includes a secondary beacon 710*b*, an optional secondary contention access period (CAP) 715*b*, and a secondary contention free period (CFP) 720*b*. The secondary contention free period 720*b* may include one or more secondary management time slots (MTSS) 725*b* and one or more secondary guaranteed time slots (GTSs) 730*b*.

The secondary superframe 705*b* is itself a set duration construct that is repeated in time. The specific duration of the secondary superframe 705*b* is described in the secondary beacon 710*b*, and determined in part by the size of the primary GTS 730*a* allocated in the primary beacon 710*a*. In actuality the secondary beacon 710*b* includes information regarding how often and at what interval the secondary beacon 710*b* is repeated, which effectively corresponds to the duration of the secondary superframe 705*b*. The fact that the secondary superframes 705*b* are not repeated contiguously is unimportant. The devices 621*b*-625*b* in the second network 600*b* are told when the secondary superframes 705*b* will be, and so the devices 621*b*-625*b* in the second network 600*b* will transmit and listen accordingly.

The secondary beacon 710*b* also contains information regarding the second network 600*b*, such as the MAC address of transmissions and the identity of the second controller 610*b*.

Individual devices 621*a*-625*a* in the first network 600*a* transmit data packets during the primary contention free period 740*a*. The devices 621*a*-625*a* use the primary guaranteed time slots 730*a* assigned to them to transmit primary data packets 735*a* to other devices 621*a*-625*a* (which may include the first controller 610*a* if the first controller 610*a* is also a device within the first network 600*a*). Each device 621*a*-625*a* may send one or more primary packets of data 735*a*, and may request an immediate primary acknowledgement (ACK) frame 740*a* from the recipient device 621*a*-625*a* indicating that the packet was successfully received, or may request a delayed (grouped) acknowledgement. If an immediate ACK frame 740*a* is requested, the transmitting device 621*a*-625*a* should allocate sufficient time in the guaranteed time slot 730*a* to allow for the ACK frame 740*a* to arrive.

Similarly, individual devices 621*b*-625*b* in the second network 600*b* transmit data packets during the secondary contention free period 740*b*. The devices 621*b*-625*b* use the secondary guaranteed time slots 730*b* assigned to them to transmit secondary data packets 735*b* to other devices 621*b*-625*b* (which may include the second controller 610*b* if the second controller 610*b* is also a device within the second network 600*b*). Each device 621*a*-625*a* may send one or more primary packets of data 735*a*, and may request an immediate secondary acknowledgement (ACK) frame 740*b* from the recipient device 621*b*-625*b* indicating that the packet was successfully received, or may request a delayed (grouped) acknowledgement. If an immediate ACK frame 740*b* is requested, the transmitting device 621*b*-625*b* should allocate sufficient time in the guaranteed time slot 730*b* to allow for the ACK frame 740*b* to arrive.

Pseudo-Static Slots

One alternative to static slots is to use dynamic slots, through which channel time allocations could change on a superframe-by-superframe basis. This would add tremendous flexibility to a system by maximizing the use of the available transmission bandwidth. Unfortunately this has several disadvantages.

First, if the size of the superframe 505 changed or the location/size of the beacon 510 changed, this would be difficult to support because the beacon 510 would be moving. The beacon 510 by definition has to be periodic, so it can't jump around superframe 505, else the devices 321-325 won't know when to look for it.

Second, if the size of the superframe 505 and the location and size of the beacon 510 remained fixed, the system would still run into problems with regard to making the slot allocation changes in an effective manner. If the slot allocations changed every superframe 505, anytime a device 321-325 missed a beacon 510, it would be unable to transmit or enter a low power mode for the entirely of the superframe 505.

Also, if overlapping network 600*a*, 600*b* are used, the site of the slot assigned within the superframe 705 to the secondary network 600*b* could never change.

An alternative to this is to use pseudo-static time slots. These are time slots that remain static unless and until they are changed and the change is confirmed. In the preferred embodiment of the system 500, time allocation within a superframe 505 can only be changed once every relevant device 321-325 in the network 300 acknowledges that it has received the information about the change. Thus, if a device 321-325 misses a beacon, it knows what the slot assignments are because it has not acknowledged a change to the current allocation scheme.

One problem that may arise with pseudo-static time slots that the system may get poor allocation of available transmission space within a contention free period 520 as devices 321-325 requiring smaller time slots cease using those slots, but the available time slots remain spread out between other continuing time slots. The system may end up with an aggregate amount of transmission time available that is sufficient for its needs, but the time is not in large enough contiguous blocks to be used effectively. This is the same problem that exists with static slots, except that pseudo-static slots offer a solution to the problem.

Figure 8A:
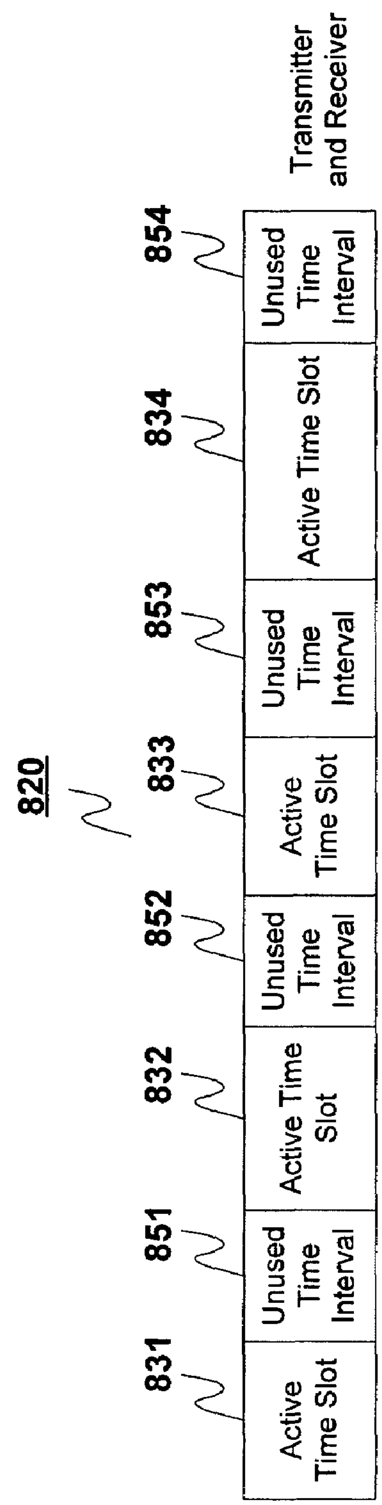
FIGS. 8A-8D illustrate a method of reallocating pseudo-static time slots in a contention free period according to a preferred embodiment of the present invention.

The problem can be seen for example in FIG. 8A, which shows a poorly allocated contention free period. As shown in FIG. 8A, the contention free period 820 includes a number of active guaranteed time slots 831-834, and a number of unused time intervals 851-854 interspersed between the active guaranteed time slots 831-834.

It then becomes desirable to compact the pseudo-static time slots 831-834 to form the available transmission time into a more convenient portion. In other words, the system will want to move the active slots 831-834 so that they're all pressed together in time and all the unused time intervals 851-854 are contiguous in the contention free period.

However, in such a case devices 321-325 do not cease transmitting. Rather, it is necessary to get actively transmitting devices to switch their assigned time slots. And the system will want to do this in a way that will make certain that the two do not lose their connection with each other.

The problem is that if the system did that all at once with a message either in the beacon or directed frame, it is possible that one of these devices 321-325 would get the message, and one of the devices 321-325 would not get the message. If that's the case, if a collision becomes possible. If, for example, device one 321 did not get the message, while device two 322 did get the message, there might be a collision because device one 321 and device two 322 might try and transmit at the same time.

As a result of these miscommunications, various devices 321-325 may miss hearing their transmissions and packets will be lost, whether it involves a transmitter sending a message at the wrong time or a receiver listening for a message at the wrong time.

The solution is to make certain that the listening device 321-325 is assigned to listen to all possible times the transmitting device 321-325 might transmit until it is certain that the transmitter has moved to its new slot. This can be done whether the time slot 530 is being shifted in place or moved to an entirely different place in the contention free period 520.

FIGS. 8A-8D shows a preferred embodiment for reallocating pseudo-static time slots in a contention free period. FIG. 9 is a flow chart describing the operation of FIGS. 8A-8D.

FIGS. 8A-8D and FIG. 9, show how to move the second active time slot 832 the first active time slot 831, eliminating the first unused time interval 851 and expanding the second unused time interval 852.

As shown in FIG. 8A, the system starts off with a contention free period 820 that includes a number of active pseudo-static time slots 831-834, and a number of unused time intervals 851-854 spaced between and adjacent the pseudo-static time slots 831-834.

To start with, the controller 310 sends out a new superframe assignment in a directed command frame assigning the receiving device associated with the second active time slot 832 a modified time slot 832*a* within the superframe 505 that includes both the second active time slot 832 and the first unused time interval 851. (Step 905) This can be done regardless of whether the first unused time interval 851 is larger or smaller than the second active time slot 851, provided the two are contiguous.

At this point the controller 310 waits to see if the receiver acknowledges the command frame, i.e., indicates that it has properly obtained the command frame with the new CTA. (Step 910) If it does not, the transmitting device continues to transmit and the receiving device continues to receive in the old time slot, i.e., the second active time slot 832. (Step 915)

Figure 8B:
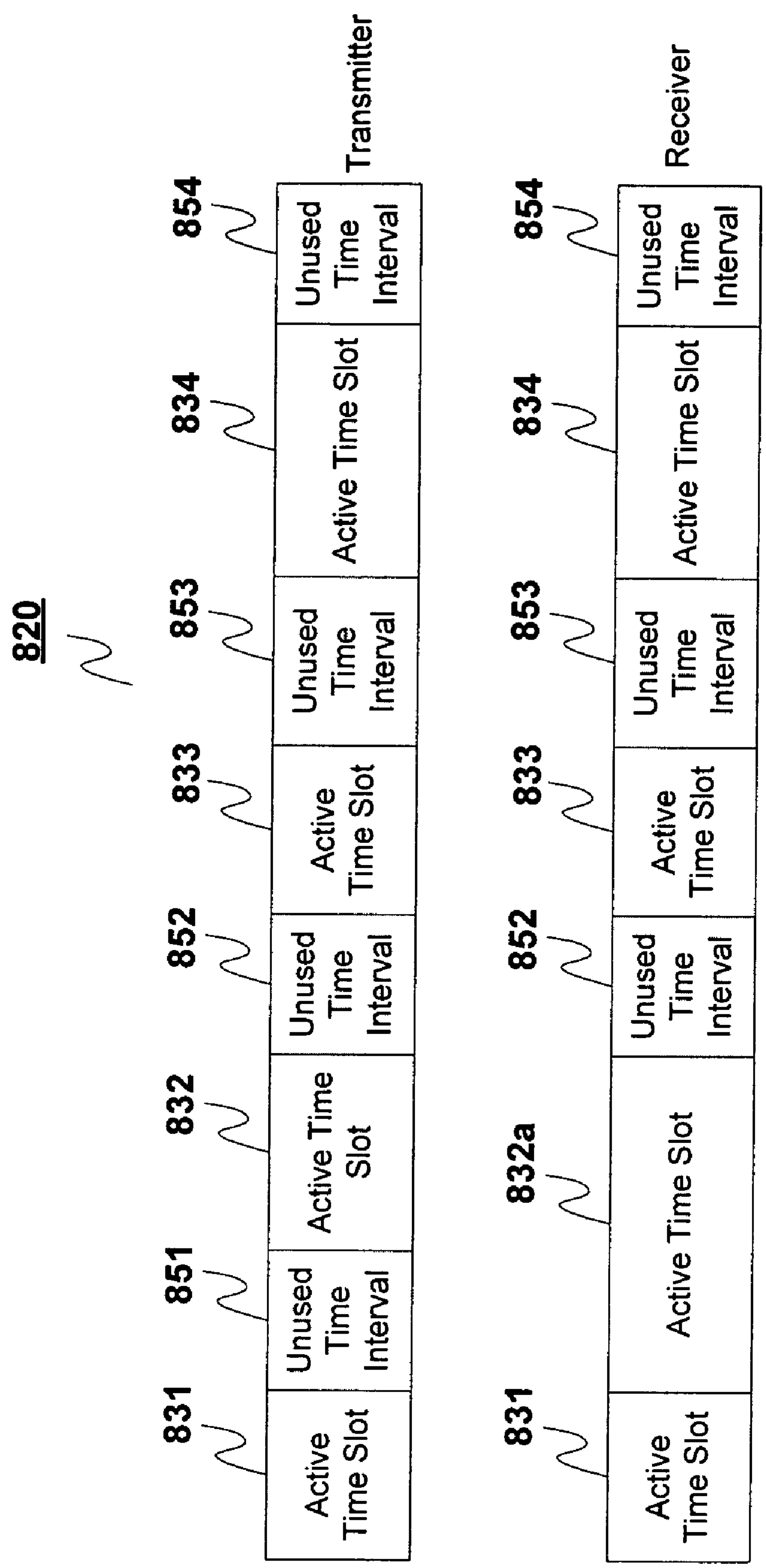
Figure 9:
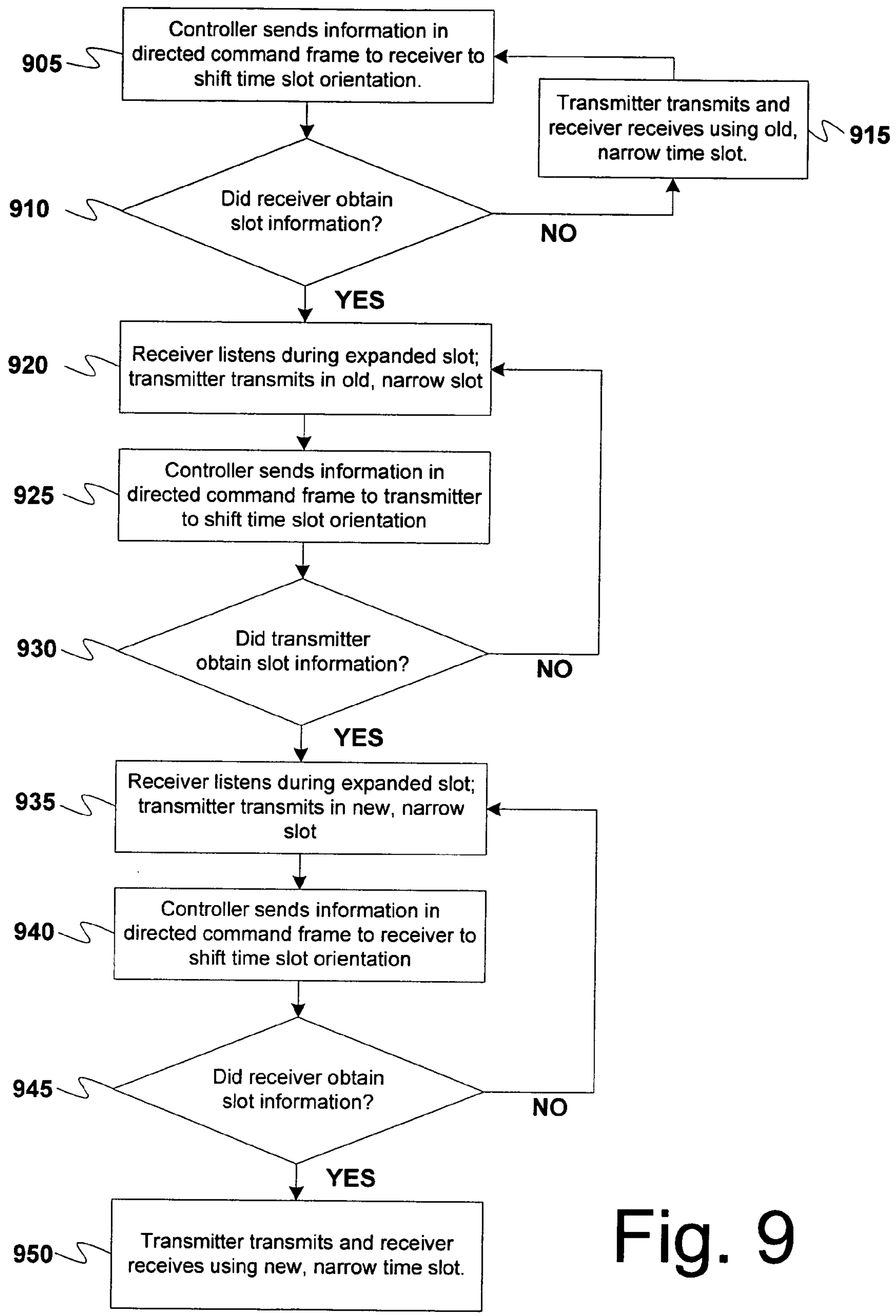
FIG. 9 is a flow chart describing the operation of FIGS. 8A-8D according to a preferred embodiment of the present invention.

If, however, the receiving device does obtain the new CTA, the transmitter continues to transmit in the old time slot, i.e., the second active time slot 832, while the receiver listens during an expanded slot 832*a* containing the both the second active time slot 832 and the first unused time interval 851, as shown in FIG. 8B. (Step 920)

Having received confirmation that the receiver has obtained the new slot assignment, the controller 310 then sends out a new superframe assignment in a directed command frame assigning the transmitting device associated with the second active time slot 832 a revised second active time slot 832*b* within the superframe 505 that is the same size as the second active time slot 832, but is moved in time so that it is immediately adjacent to the first active time slot 831. (Step 925).

At this point the controller 310 waits to see if the transmitter acknowledges the command frame, i.e., indicates that it has properly obtained the command frame with the new CTA. (Step 930) If it does not, the transmitter continues to transmit in the old time slot, i.e., the second active time slot 832, while the receiver continues to listen during the expanded time slot 832*a* containing the both the second active time slot 832 and the first unused time interval 851. (Step 925) The controller 310 will then try again to send the new allocation information via the command frame. (Step 930)

Figure 8C:
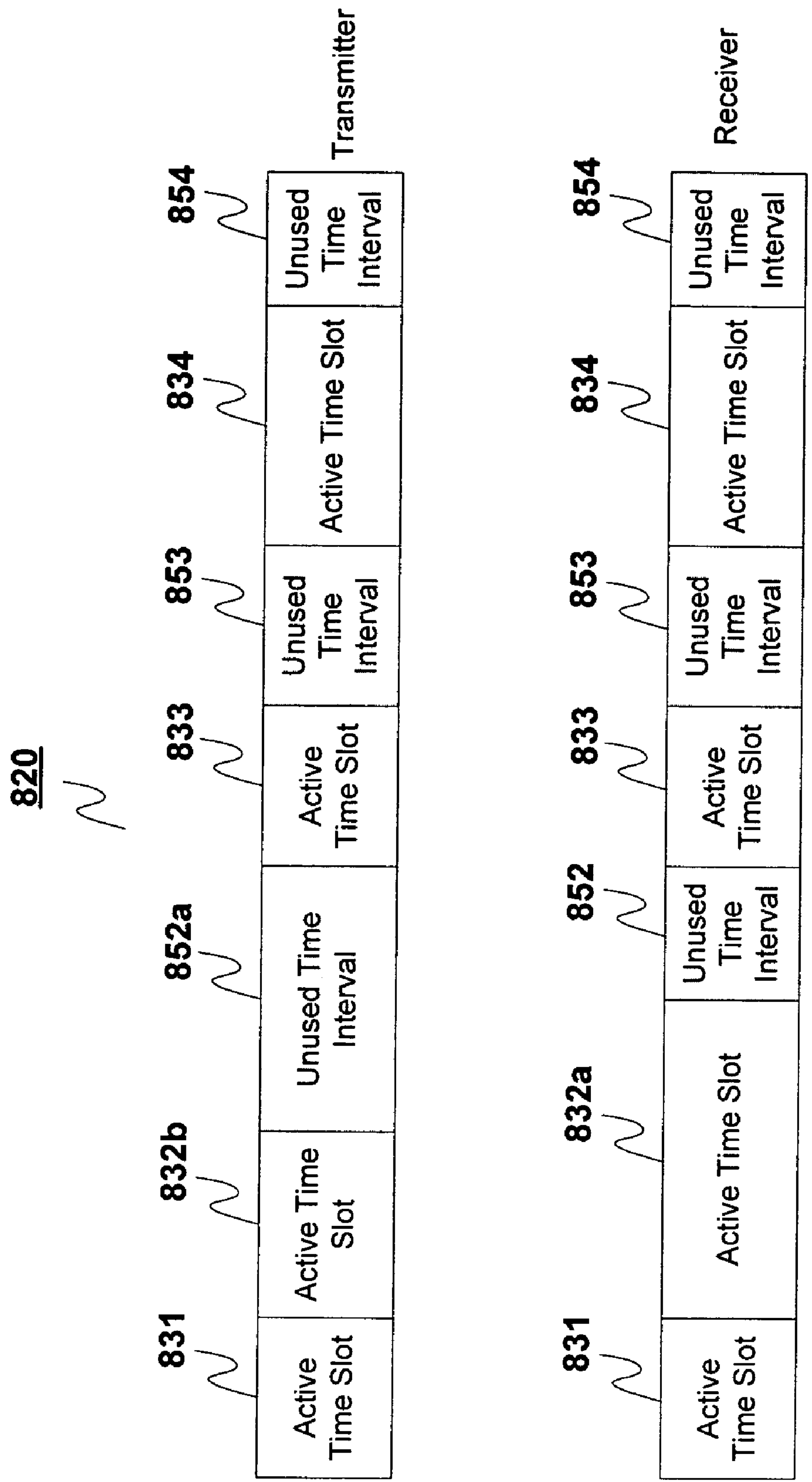

If, however, the transmitting device does obtain the new CTA, the transmitter begins to transmit in the revised second active time slot 832*b* within the superframe 505 that is the same size as the second active time slot 832, but is moved in time so that it is contiguous with the first active time slot 831, while the receiver continues to listen during the expanded slot 832*a* containing the both the second active time slot 832 and the first unused time interval 851, as shown in FIG. 8C. (Step 935)

Having received confirmation that the transmitter has obtained the new slot assignment, the controller 310 then sends out a new superframe assignment in the directed command frame assigning the receiving device associated with the second active time slot 832 a revised second active time slot 832*b* within the superframe 505 that is the same size as the second active time slot 832, but is moved in time so that it is contiguous with the first active time slot 831. (Step 940).

At this point the controller 310 waits to see if the receiver acknowledges the directed command frame, i.e., indicates that it has properly obtained the command frame with the new CTA. (Step 945) If it does not, the transmitter continues to transmit in the a revised second active time slot 832*b*, while the receiver continues to listen during the expanded time slot 832*a*. (Step 935) The controller 310 will then try again to send the new allocation information via the command frame. (Step 940)

Figure 8D:
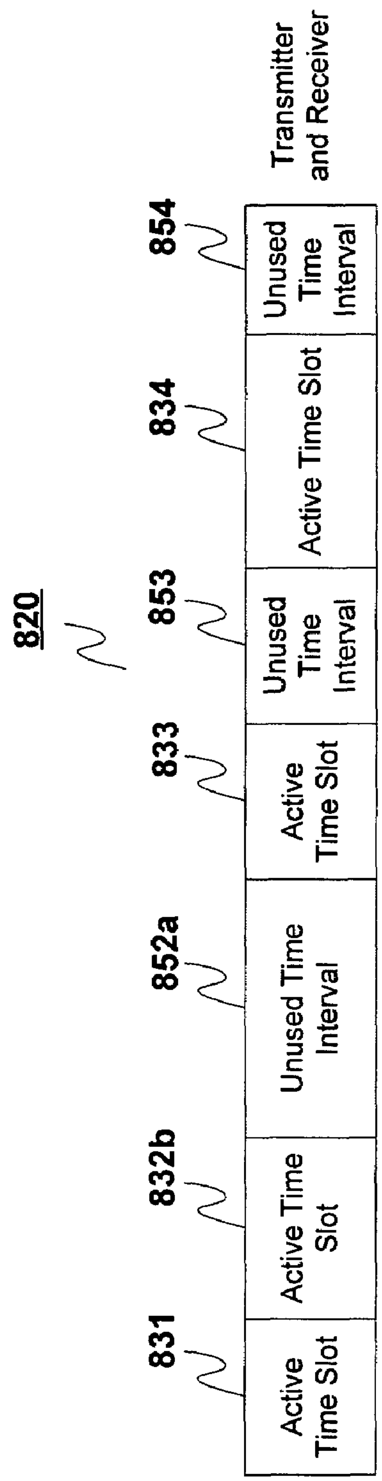

If, however, the receiving device does obtain the new CTA via the command frame, the transmitter continues to transmit in the revised second active time slot 832*b*, while the receiver begins listening only in the revised second active time slot 832*b*, as shown in FIG. 8D. (Step 950) The movement of the time slot is complete.

At this time a revised second unused time interval 852*a* has now been formed that is larger than the original second unused time interval 852. This new unused time interval can now be assigned as a time slot, or another time slot could be moved to again increase the size of the unused time interval.

It is important that any part of the extended area 832*a* that the receiver is told to listen to that is not covered by the second assigned time slot 832 be unassigned. This is because if any other device 321-325 is transmitting during that interval, the receiver could hear them and a collision could occur. As a result, the system can only move an active slot to an unassigned slot.

This system is very stable at every step along the way. This means that if it takes multiple superframes to get a device (transmitting or receiving) to acknowledge the change, the system will continue to function without any chance of collisions. At each step the system can continue indefinitely without concern for collisions.

In addition, this makes the change between time slots in a quick way that minimizes the number of steps required, thus improving speed of operation and reducing complexity.

Furthermore, although this disclosed embodiment shows shifting a time slot to cover an unused time interval, it is also possible to move a time slot entirely to a new spot within the superframe 505. This may happen, for example, when the system has a small time slot that is spaced between two larger unused time intervals.

In alternate embodiments you could also move multiple slots at once, so long as no overlap occurred and you shifted each slot to cover an unused time interval.

FIGS. 10A-10D and FIG. 11, show how to move a fourth active time slot 1034 to a first unused time interval 1051, eliminating all or part of the first unused time interval 1051 and all of the fourth unused time interval 1054, and expanding the third unused time interval 1053.

First the controller 310 sends out a new superframe assignment in a directed command frame assigning the receiving device associated with the fourth active time slot 1034 two time slots within the superframe 505: the fourth active time slot 1034, and a revised fourth active time slot 1034*a* that includes some or all of the first unused time interval 1051. (Step 1105) This can only be done if the first unused time interval 1051 is the same size or larger than the fourth active time slot 1034.

At this point the controller 310 waits to see if the receiver acknowledges the command frame, i.e., indicates that it has properly obtained the command frame with a new CTA. (Step 1110) If it does not, the transmitting device continues to transmit and the receiving device continues to receive in the old time slot, i.e., the fourth active time slot 1034. (Step 1115)

If, however, the receiving device does obtain the command frame with the new CTA, the transmitter continues to transmit in the old time slot, i.e., the fourth active time slot 1034, while the receiver listens during both the fourth active time slot 1034, and the revised fourth active time slot 1034*a*, which is within the first unused time interval 1051. (Step 1120)

Having received confirmation that the receiver has obtained the new CTA, the controller 310 then sends out a new superframe assignment in the command frame assigning the transmitting device associated with the fourth active time slot 1034 to the revised fourth active time slot 1034*a* within the superframe 505 that is the same size as the fourth active time slot 1034, but is moved in time so that it is placed within the first unused time interval 1051. (Step 1125).

At this point the controller 310 waits to see if the transmitter acknowledges the directed command frame, i.e., indicates that it has properly obtained the CTA information in the command frame. (Step 1130) If it does not, the transmitter continues to transmit in the old time slot, i.e., the fourth active time slot 1034, while the receiver continues to listen during both the fourth active time slot 1034 and the revised fourth active time slot 1034*a*. (Step 1125) The controller 310 will then try again to send the new allocation information via a command frame. (Step 1130)

If, however, the transmitting device does obtain the new CTA information, the transmitter begins to transmit in the revised fourth active time slot 1034*a* within the superframe 505, which is the same size as the fourth active time slot 1034, but is moved in time so that it is placed within the first unused time interval 1051. (Step 1135)

Having received confirmation that the transmitter has obtained the new slot assignment, the controller 310 then sends out a new superframe assignment in the directed command frame assigning the receiving device associated with the fourth active time slot 1034 to the revised fourth active time slot 1034*a*. (Step 1140).

At this point the controller 310 waits to see if the receiver acknowledges the command frame information, i.e., indicates that it has properly obtained the new CTA information in the command frame. (Step 1145) If it does not, the transmitter continues to transmit in the revised fourth active time slot 1034*a*, while the receiver continues to listen during both the fourth active time slot 1034, and the revised fourth active time slot 1034*a*. (Step 1135) The controller 310 will then try again to send the new allocation information via the command frame. (Step 1140)

If, however, the receiving device does obtain the new CTA information, the transmitter continues to transmit in the revised fourth active time slot 1034*a*, while the receiver begins listening only in the revised fourth active time slot 1034*a*. (Step 1150) The movement of the time slot is complete.

At this time at least part of the first fourth unused time interval 1051 is eliminated, all of the fourth unused time interval 1054 is eliminated, and a revised third unused time interval 1053*a* is formed that is larger than the original third unused time interval 1053. This new unused time interval 1053*a* can now be assigned as a time slot, or another time slot could be moved to again increase the size of the unused time interval.

It is important that any part of the revised fourth time slot 1034*a* that the receiver is told to listen to be unassigned. This is because if any other device 321-325 is transmitting during that interval, the receiver could hear them and a collision could occur. As a result, the system can only move an active slot to an unassigned slot.

As noted above, this system is very stable at every step along the way. This means that if it takes multiple superframes to get a device (transmitting or receiving) to acknowledge the change, the system will continue to function without an increased chance of collisions. At each step the system can continue indefinitely without concern for collisions.

This makes the change between time slots in a quick way that minimizes the number of steps required, thus improving speed of operation and reducing complexity.

In alternate embodiments you could also move multiple slots at once, so long as no overlap occurred and you shifted each slot to an unused time interval.

Figure 12:
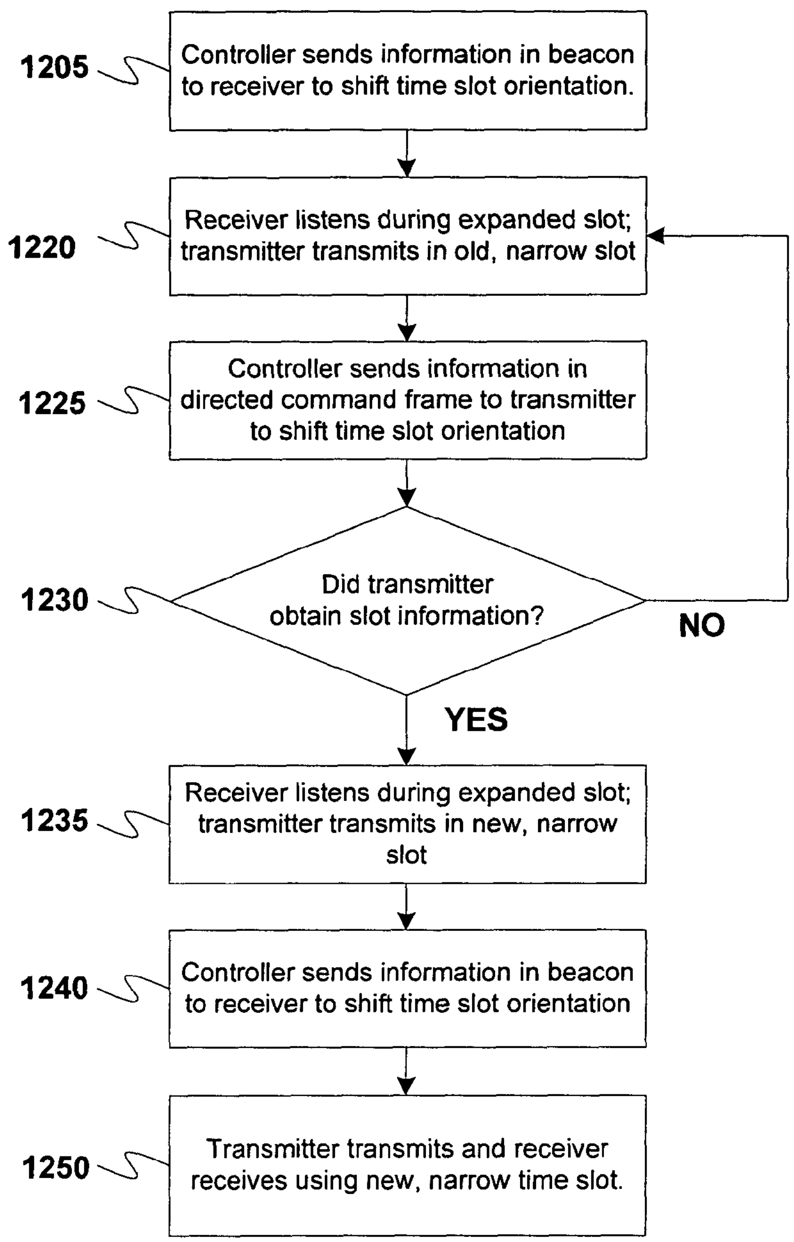
FIG. 12 is a flow chart describing the operation of FIGS. 8A-8D according to another preferred embodiment of the present invention.
Figure 13:
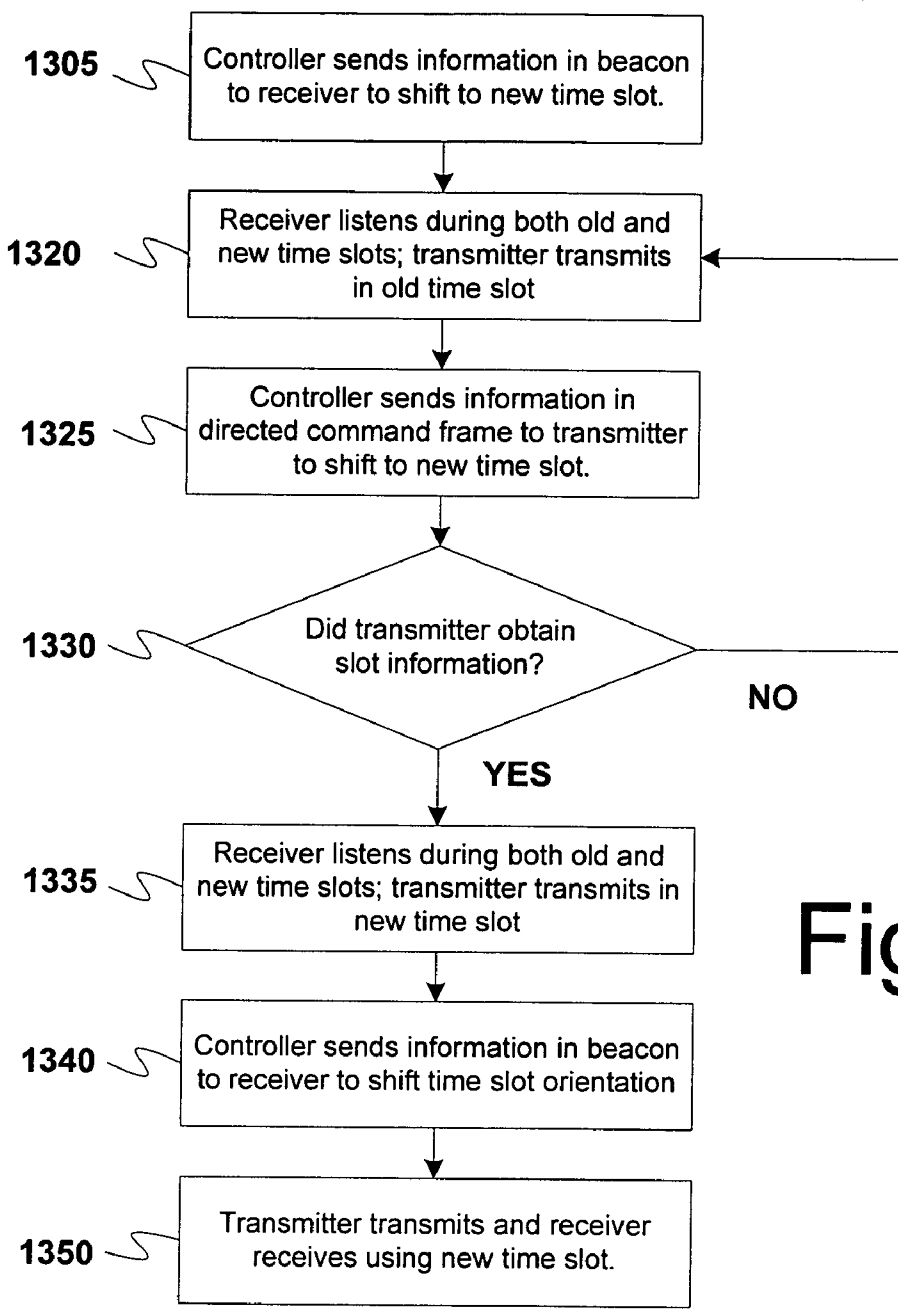
FIG. 13 is a flow chart describing the operation of FIGS. 10A-10D according to another preferred embodiment of the present invention.

In addition, it is also possible for the controller 310 to send directed frames only to the transmitter, leaving the receiver to listen to CTAs in the beacon. In such an embodiment the receiver must listen to the entire superframe if it does not hear the beacon. This allows the system to eliminate the need for the receiver to acknowledge receipt of new slot assignment information. FIGS. 12 and 13 are flow charts that describe the process of FIGS. 8A-8D and FIGS. 10A-10D, respectively, using this implementation.

As shown in FIG. 8A, the system starts off with a contention free period 820 that includes a number of active pseudo-static time slots 831-834, and a number of unused time intervals 851-854 spaced between and adjacent the pseudo-static time slots 831-834.

To start with, the controller 310 sends out a new superframe assignment in a beacon assigning the receiving device associated with the second active time slot 832 a modified time slot 832*a* within the superframe 505 that includes both the second active time slot 832 and the first unused time interval 851. (Step 1205) This can be done regardless of whether the first unused time interval 851 is larger or smaller than the second active time slot 851, provided the two are contiguous.

At this point the transmitter will continue to transmit in the old time slot, i.e., the second active time slot 832, while the receiver will listen during an expanded slot 832*a* containing the both the second active time slot 832 and the first unused time interval 851, as shown in FIG. 8B. (Step 1220)

If for some reason the receiver ever misses the beacon, it will listen to the entire superframe to see if it is assigned to read any slots during that superframe. Thus, whether it receives the beacon or not, the receiver will be listening during the entire expanded slot 832*a*.

The controller 310 then sends out a new superframe assignment in a directed command frame assigning the transmitting device associated with the second active time slot 832 a revised second active. time slot 832*b* within the superframe 505 that is the same size as the second active time slot 832, but is moved in time so that it is immediately adjacent to the first active time slot 831. (Step 1225).

At this point the controller 310 waits to see if the transmitter acknowledges the command frame, i.e., indicates that it has properly obtained the command frame with the new CTA. (Step 1230) If it does not, the transmitter continues to transmit in the old time slot, i.e., the second active time slot 832, while the receiver continues to listen during the expanded time slot 832*a* containing the both the second active time slot 832 and the first unused time interval 851. (Step 1225) The controller 310 will then try again to send the new allocation information via the command frame. (Step 1230)

If, however, the transmitting device does obtain the new CTA, the transmitter begins to transmit in the revised second active time slot 832*b* within the superframe 505 that is the same size as the second active time slot 832, but is moved in time so that it is contiguous with the first active time slot 831, while the receiver continues to listen during the expanded slot 832*a* containing the both the second active time slot 832 and the first unused time interval 851, as shown in FIG. 8C. (Step 1235)

Again, in either case, if the receiver ever misses a beacon, it listens to the entire superframe.

Having received confirmation that the transmitter has obtained the new slot assignment, the controller 310 then sends out a new superframe assignment in the beacon assigning the receiving device associated with the second active time slot 832 a revised second active time slot 832*b* within the superframe 505 that is the same size as the second active time slot 832, but is moved in time so that it is contiguous with the first active time slot 831. (Step 1240). Each successive beacon will contain this information.

Under this scheme the transmitter continues to transmit in the revised second active time slot 832*b*, while the receiver begins listening only in the revised second active time slot 832*b*, as shown in FIG. 8D. (Step 1250) The movement of the time slot is complete.

At this time a revised second unused time interval 852*a* has now been formed that is larger than the original second unused time interval 852. This new unused time interval can now be assigned as a time slot, or another time slot could be moved to again increase the size of the unused time interval.

It is important that any part of the extended area 832*a* that the receiver is told to listen to that is not covered by the second assigned time slot 832 be unassigned. This is because if any other device 321-325 is transmitting during that interval, the receiver could hear them and a collision could occur. As a result, the system can only move an active slot to an unassigned slot.

As noted above, this system is very stable at every step along the way. That means that if it takes multiple superframes to get the transmitter to acknowledge the change, the system will continue to function without any chance of collisions. At each step the system can continue indefinitely without concern for collisions.

Furthermore, the added effort that the receiver will have to use to listen to an entire superframe if it misses a beacon is balanced out by a simplification of the system. The system need no longer worry about coordinating acknowledgements from the receiver.

Figure 10A:
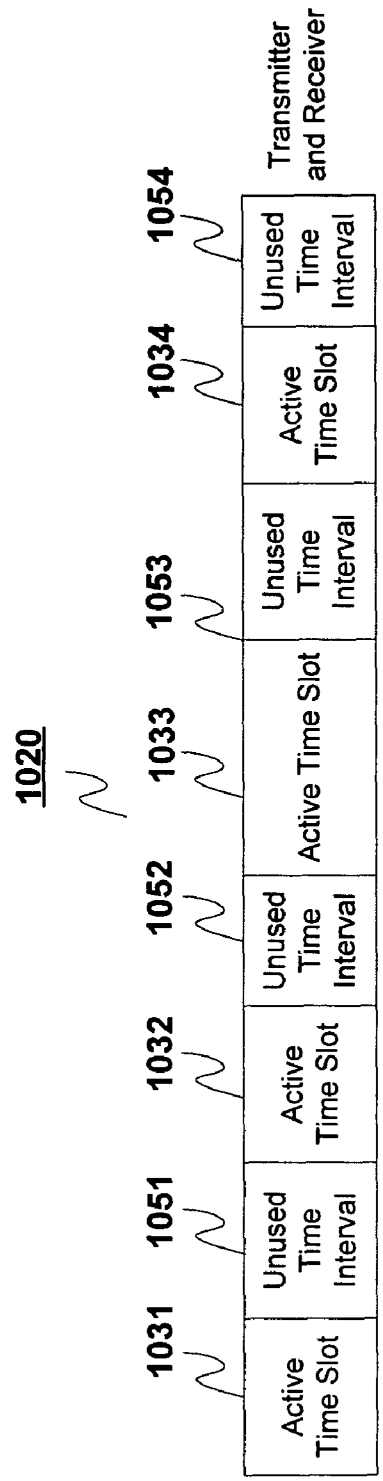
FIGS. 10A-10D illustrate a method of reallocating pseudo-static time slots in a contention free period according to a preferred embodiment of the present invention.
Figure 10B:
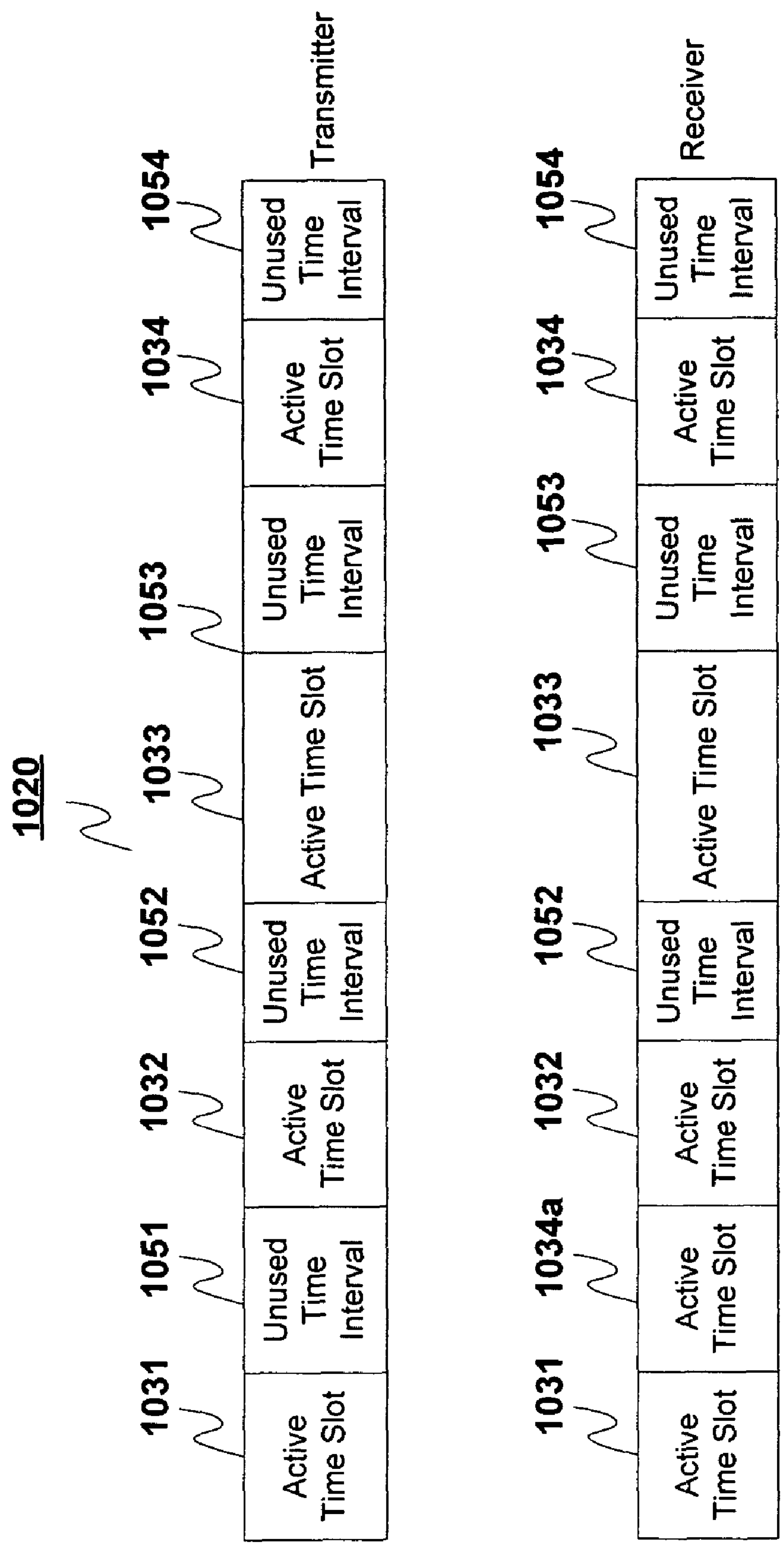
Figure 10C:
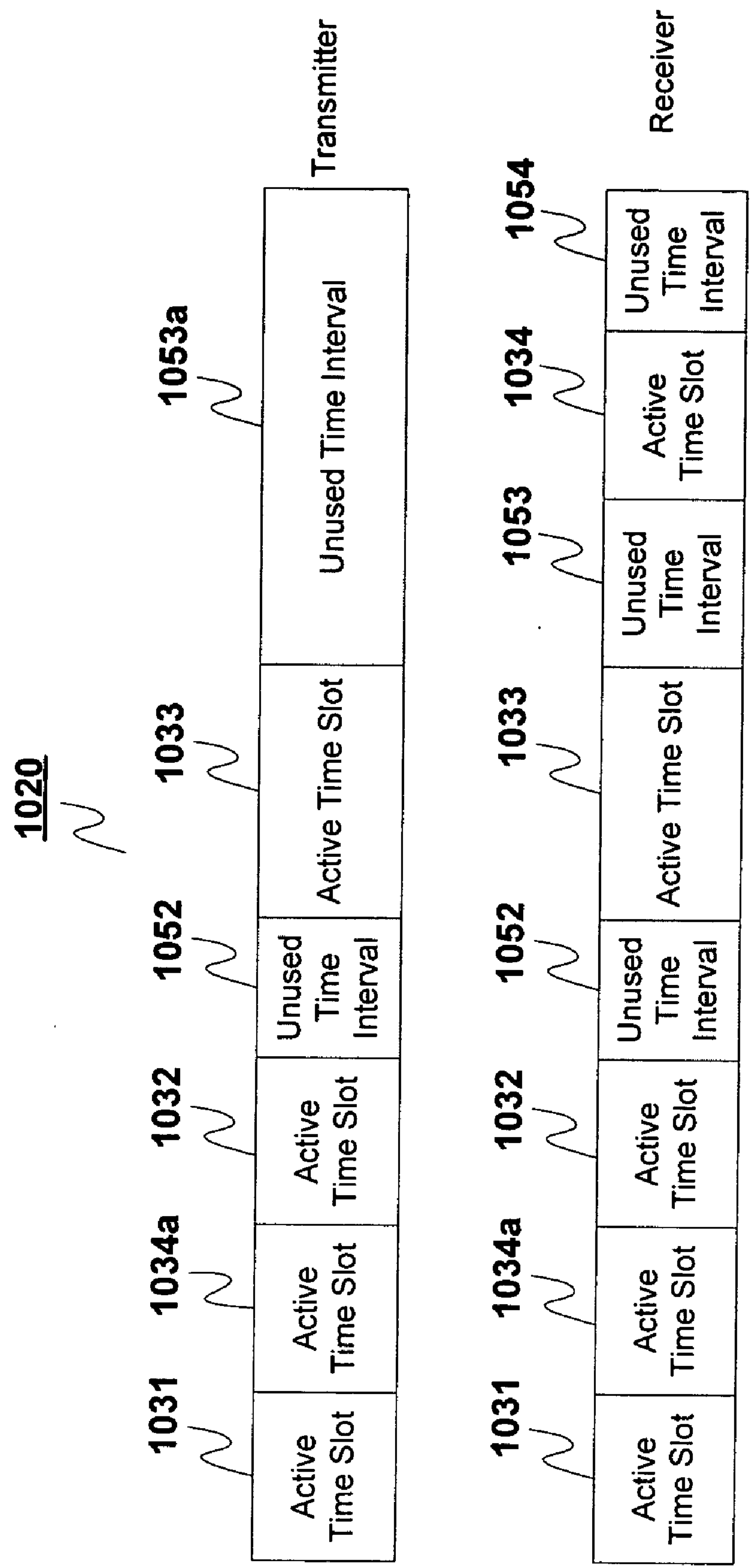
Figure 10D:
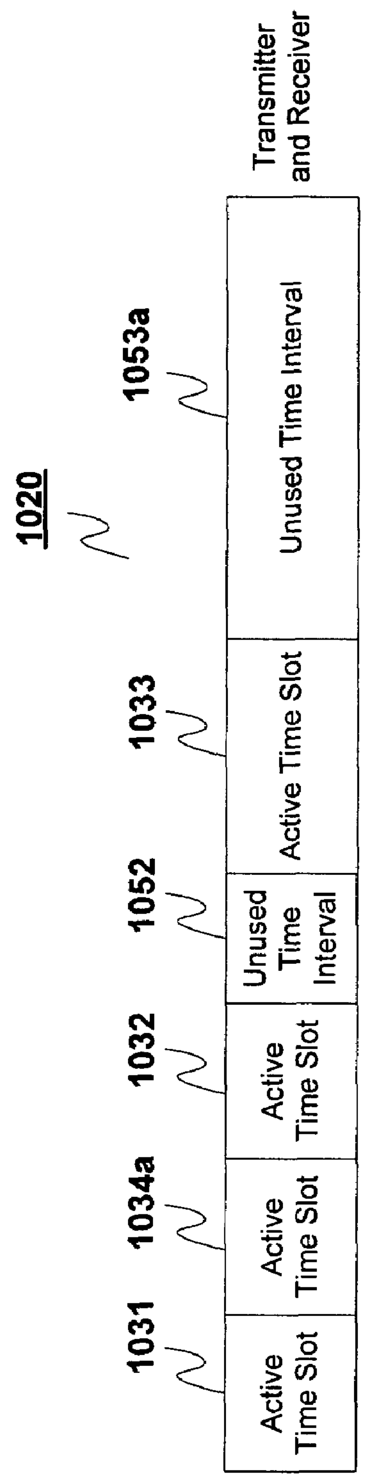
Figure 11:
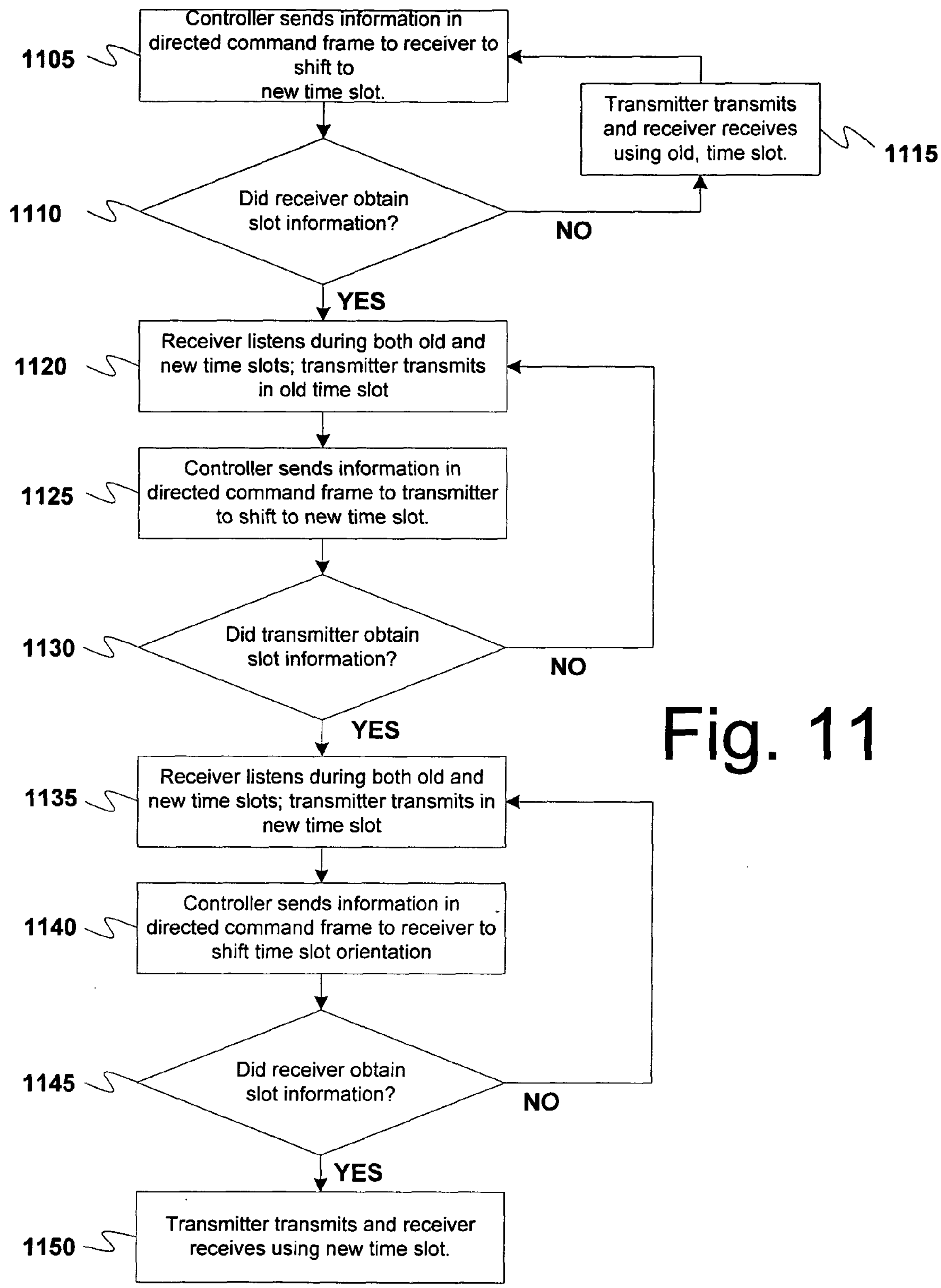
FIG. 11 is a flow chart describing the operation of FIGS. 10A-10D according to a preferred embodiment of the present invention.

As shown in FIG. 10A, the system starts off with a contention free period 820 that includes a number of active pseudo-static time slots 1031-1034, and a number of unused time intervals 1051-1054 spaced between and adjacent the pseudo-static time slots 1031-1034.

To start with, the controller 310 sends out a new superframe assignment in a beacon assigning the receiving device associated with the fourth active time slot 1034 two time slots within the superframe 505: the fourth active time slot 1034, and a revised fourth active time slot 1034*a* that includes some or all of the first unused time interval 1051. (Step 1305) This can only be done if the first unused time interval 1051 is the same size or larger than the fourth active time slot 1034.

At this point, the transmitter continues to transmit in the old time slot, i.e., the fourth active time slot 1034, while the receiver listens during both the fourth active time slot 1034, and the revised fourth active time slot 1034*a*, which is within the first unused time interval 1051. (Step 1320)

If for some reason the receiver ever misses the beacon, it will listen to the entire superframe to see if it is assigned to read any slots during that superframe. Thus, whether it receives the beacon or not, the receiver will be listening both the fourth active time slot 1034, and the revised fourth active time slot 1034*a*.

The controller 310 then sends out a new superframe assignment in a directed command frame assigning the transmitting device associated with the fourth active time slot 1034 to the revised fourth active time slot 1034*a* within the superframe 505 that is the same size as the fourth active time slot 1034, but is moved in time so that it is placed within the first unused time interval 1051. (Step 1325).

At this point the controller 310 waits to see if the transmitter acknowledges the command frame, i.e., indicates that it has properly obtained the CTA information in the command frame. (Step 1330) If it does not, the transmitter continues to transmit in the old time slot, i.e., the fourth active time slot 1034, while the receiver continues to listen during both the fourth active time slot 1034 and the revised fourth active time slot 1034*a*. (Step 1325) The controller 310 will then try again to send the new allocation information via a command frame. (Step 1330)

If, however, the transmitting device does obtain the new CTA information, the transmitter begins to transmit in the revised fourth active time slot 1034*a* within the superframe 505, which is the same size as the fourth active time slot 1034, but is moved in time so that it is placed within the first unused time interval 1051. (Step 1135)

Again, in either case, if the receiver ever misses a beacon, it listens to the entire superframe.

Having received confirmation that the transmitter has obtained the new slot assignment, the controller 310 then sends out a new superframe assignment in the beacon assigning the receiving device associated with the fourth active time slot 1034 to the revised fourth active time slot 1034*a*. (Step 1340).

Under this scheme the transmitter continues to transmit in the revised fourth active time slot 1034*a*, while the receiver begins listening only in the revised fourth active time slot 1034*a*. (Step 1350) The movement of the time slot is complete.

At this time at least part of the first fourth unused time interval 1051 is eliminated, all of the fourth unused time interval 1054 is eliminated, and a revised third unused time interval 1053*a* is formed that is larger than the original third unused time interval 1053. This new unused time interval 1053*a* can now be assigned as a time slot, or another time slot could be moved to again increase the size of the unused time interval.

It is important that any part of the revised fourth time slot 1034*a* that the receiver is told to listen to be unassigned. This is because if any other device 321-325 is transmitting during that interval, the receiver could hear them and a collision could occur. As a result, the system can only move an active slot to an unassigned slot.

As noted above, this system is very stable at every step along the way. This means that if it takes multiple superframes to get a transmitter to acknowledge the change, the system will continue to function without an increased chance of collisions. At each step the system can continue indefinitely without concern for collisions.

Furthermore, the added effort that the receiver will have to use to listen to an entire superframe if it misses a beacon is balanced out by a simplification of the system. The system need no longer worry about coordinating acknowledgements from the receiver.

In addition, this makes the change between time slots in a quick way that minimizes the number of steps required, thus improving speed of operation and reducing complexity.

Alternate Manner of Coordinating Reassignment of Pseudo-Static Slots

The preferred embodiment disclosed above provides a way in which the reassignment of pseudo-static slots can be achieved without any chance of miscommunication between devices or any chance that the transmitter and receiver will fail to coordinate with each other. However, in alternate embodiments, it may be desirable to limit the amount of time that a receiver has to remain on, e.g., to limit power consumption.

One way to achieve this is to limit the amount of time that a transmitting device will transmit when it misses a beacon (and thus misses any new time slot assignment). Similarly, each potential receiver can be set so that it listens to both the old and new time slot assignments for a short time after the change to allow the transmitter time to catch up if it missed the beacon with the time slot orientation change information.

In one preferred embodiment a maximum number of allowable lost beacons will be set for the transmitter. If a transmitting device ever fails to properly receive a beacon, it may continue to transmit in its most recently assigned pseudo-static time slot. If it continues to miss beacons, it can continue transmitting in this assigned pseudo-static time slot for a number of superframes equal to the maximum number of allowable lost beacons for the transmitter. Once a transmitter misses more than the maximum number of allowable lost beacons, it will stop transmitting data.

Once a transmitting device properly receives a beacon (including a pseudo-static time slot assignment, whether new or old) it will immediately begin transmitting in its assigned pseudo-static time slot. Thus, when a transmitter receives a newly assigned pseudo-static time slot, it immediately begins transmitting in that time slot.

Receivers may behave differently upon missing a beacon, depending upon how power conscious they are. If the receiver is very power conscious, it may listen only in the most recently assigned time slot it is aware of when it misses a beacon, regardless of how many beacons it may have missed. If, however, the receiver can spare the power to do so, it may listen to the entire superframe whenever it misses a beacon. Thus, if the receiver can spare the power to monitor an entire superframe whenever it misses a beacon, it will be able to hear the transmission from the transmitter regardless of what time slot it is transmitted in.

Regardless of how it reacts when it misses a beacon, whenever a receiver properly receives a beacon that includes a newly assigned new pseudo-static time slot, the receiver listens to both the new pseudo-static time slot and the most recently assigned pseudo-static time slot for a number of superframes equal to the maximum number of allowable lost beacons. In this way, even if a transmitter misses a few beacons and transmits in the old pseudo-static time slot for a few superframes, the receiver can still maintain communication. And if the transmitter then receives a beacon with the new pseudo-static time slot assignment before the maximum number of allowable lost beacons have passed, it can change over to the new time slot without the receiver having missed any information.

Thus, in this embodiment when a transmitting device successfully receives a new channel time allocation (i.e., a new placement for a pseudo-static GTS), it begins transmitting in that new time slot immediately. However, when a receiving device receives a new channel time allocation (i.e., a new placement for a pseudo-static GTS), it listens to both the old and new allocated time slots for a number of superframes equal to the maximum allowable number of lost beacons. Thus, there is no need for the receiver and transmitter to pass any confirmation information regarding whether they have properly transitioned to the new channel time allocation.

FIG. 14 is a flow chart showing the operation of a transmitting and receiving device according to a preferred embodiment of the present invention. As shown in FIG. 14, a data transmission process 1400 begins when a controller sends information in a directed command frame to both the transmitter and the receiver to shift time slot orientation (i.e., to adjust the timing or placement of a pseudo-static time slot). (Step 1405) This times slot orientation shift will preferably be accomplished by sending the information regarding the time slot shift in a beacon.

The transmitter and receiver may both receive or not receive the time slot shift information (i.e., whether they receive the beacon in this embodiment). Therefore, to determine the result of the time slot orientation change it is necessary to determine if the transmitter has received the beacon (Step 1410) and whether the receiver has received the beacon. (Steps 1415 and 1425).

If the transmitter has received the beacon (and the associated time slot shift information) as determined in Step 1410, and the receiver has received the beacon (and the associated time slot shift information) as determined in Step 1415, the transmitter begins immediately transmitting in the new pseudo-static time slot and the receiver listens in both the old time slot and the new time slot. (Step 1430) In this case, the transmission is successfully passed from transmitter to receiver. At the end of a set number of time slots equal to the maximum number of lost beacons, the receiver will begin to listen only to the new pseudo-static time slot.

If the transmitter has received the beacon (and the associated time slot shift information) as determined in Step 1410, but the receiver has not received the beacon (and the associated time slot shift information) as determined in Step 1415, the transmitter begins immediately transmitting in the new pseudo-static time slot and the receiver preferably listens during the entire superframe. (Step 1435) In this case, the receiver will be listening regardless of which time slot the transmitter sends during.

In alternate embodiments, however, where the power consumption of the receiver must be limited, Step 1435 may be altered such that the receiver only listens during the old time slot (i.e., the most recently assigned time slot). In this case, no transmission passes from the transmitter to receiver and an error will occur (as in Step 1440). The network should then continue with normal error processing for a lost transmission stream.

If the transmitter does not receive the beacon (and the associated time slot shift information) as determined in Step 1410, it is necessary to further determine whether the transmitter has missed more than a maximum allowable number of consecutive beacons. (Step 1420)

If the transmitter has not received the beacon (and the associated time slot shift information) as determined in Step 1410, and the transmitter has not missed more than the maximum allowable beacons as determined in Step 1420, and the receiver has received the beacon (and the associated time slot shift information) as determined in Step 1425, the transmitter continues to transmit in the old pseudo-static time slot and the receiver listens in both the old time slot and the new time slot. (Step 1445) In this case, the transmission is successfully passed from transmitter to receiver. At the end of a set number of time slots equal to the maximum number of lost beacons, the receiver will begin to listen only to the new pseudo-static time slot. However, since in this instance the transmitter cannot have missed more than the maximum allowable beacons since the time slot orientation change, the receiver will still be listening to both the old and new time slots.

If the transmitter has not received the beacon (and the associated time slot shift information) as determined in Step 1410, and the transmitter has not missed more than the maximum allowable beacons as determined in Step 1420, and the receiver has not received the beacon (and the associated time slot shift information) as determined in Step 1425, the transmitter continues to transmit in the old pseudo-static time slot and the receiver listens during the entire superframe. (Step 1450) In this case the transmission from the transmitter to the receiver may pass successfully, depending upon whether the old pseudo-static time slot is still open.

In alternate embodiments, however, where the power consumption of the receiver must be limited, Step 1450 may be altered such that the receiver only listens during the old time slot (i.e., the most recently assigned time slot). However, since in this instance the transmitter is also transmitting in the old time slot, the transmission from the transmitter to the receiver may pass successfully, depending upon whether the old pseudo-static time slot is still open.

If, however, the transmitter has not received the beacon (and the associated time slot shift information) as determined in Step 1410, and the transmitter has missed more than the maximum allowable beacons as determined in Step 1420, the transmitter stops transmitting and enters an error mode. (Step 1440) The network should then continue with normal error processing for a lost transmission stream.

Although this preferred embodiment does not provide level of accuracy in change of pseudo-static time slot orientation of the previous embodiment, the reduction in overhead (i.e., lack of required acknowledgement packets from transmitter to receiver and vice versa) provides for an improvement in speed in implementations where beacons are not missed very often.

If the maximum number of allowable missed beacons is set to zero, then the receiver will never have to listen to extra time slots and the transmitter will fail to transmit each time it misses a beacon. In this case the time slots can be considered dynamic time slots rather than pseudo-static time slots.

Overlapping Networks Using Pseudo-Static Slots

It is also possible to assign pseudo-static time slots in a primary network 600*a* to a secondary network 600*b*. The assigned pseudo-static time slots behave just like superframes for the secondary network 600*b*, and their size and location can be modified just as they would be within the primary network 600*a*. The only difference is that the secondary controller 610*b* communicates with the primary controller 610*a* of the primary network 600*a* instead of a device 621*a*-625*a* within the primary network 600*a*.

In this case the secondary controller 610*b* may have to wait until it has received acknowledgements from each of its devices 621*b*-625*b* before it can send an acknowledgement to the primary controller 610*a*. However, since the system is stable at all times during a pseudo-static times slot change, the fact that this may take an extended period of time will not increase the chance of collisions between devices of either network 600*a*, 600*b*.

CONCLUSION

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at the IEEE website in the portion concerned with the IEEE 802.15 WPAN™ Task Group 3. Nothing in this disclosure should be considered to be incompatible with the draft 802.15.3 standard, as set forth on the IEEE 802 LAN/MAN Standards Committee web page.

Thus, one preferred embodiment of the present invention is used in an ultrawide bandwidth network. However, it is applicable to other sorts of networks as well.

Obviously, numerous modifications and variations of the present invention are possible in light of the above teachings. It is therefore to be understood that within the scope of the appended claims, the invention may be practiced otherwise than as specifically described herein.

What is claimed is:

1. A method of controlling a transmitter and a receiver to adjust transmitting and receiving times in superframes having a plurality of active time slots and one or more unassigned time intervals, the transmitter and the receiver both being initially assigned to a staffing time slot chosen from the plurality of active time slots, comprising:

sending instructions from a controller to both the transmitter and the receiver during a first superframe, the instructions instructing the transmitter to transmit signals during an ending time slot formed in the one or more unassigned time intervals;

receiving the instructions at the receiver during the first superframe; and listening for the signals at the receiver during both the staffing active time slot and the ending time slot during n consecutive superframes after the first superframe, wherein n is an integer greater than zero.

2. A method of controlling a transmitter and a receiver to adjust transmitting and receiving times in a superframe having a plurality of active time slots and one or more unassigned time intervals, as recited in claim 1, further comprising transmitting the signals from the transmitter during the staffing time slot during at least one of the n consecutive superframes.

3. A method of controlling a transmitter and a receiver to adjust transmitting and receiving times in a superframe having a plurality of active time slots and one or more unassigned time intervals, as recited in claim 2, further comprising:

receiving the instructions at the transmitter during one of the n consecutive superframes; and transmitting the signals from the transmitter during the ending time slot in at least one of the n consecutive superframes.

4. A method of controlling a transmitter and a receiver to adjust transmitting and receiving times in a superframe having a plurality of active time slots and one or more unassigned time intervals, as recited in claim 1, further comprising:

receiving the instructions at the transmitter during the first superframe; and transmitting the signals from the transmitter during the ending time slot in each of the n consecutive superframes.

5. A method of controlling a transmitter and a receiver to adjust transmitting and receiving times in a superframe having a plurality of active time slots and one or more unassigned time intervals, as recited in claim 1, further comprising listening for the signals at the receiver during the ending active time slot during all later superframes after the n consecutive superframes.

6. A method of controlling a transmitter and a receiver to adjust transmitting and receiving times in a superframe having a plurality of active time slots and one or more unassigned time intervals, as recited in claim 1, wherein the instructions are placed inside of a beacon within the first superframe.

7. A method of controlling a transmitter and a receiver to adjust transmitting and receiving times in a superframe having a plurality of active time slots and one or more unassigned time intervals, as recited in claim 1, further comprising sending the instructions from the controller to both the transmitter and the receiver in each of the n consecutive superframes.

8. A method of controlling a transmitter and a receiver to adjust transmitting and receiving times in a superframe having a plurality of active time slots and one or more unassigned time intervals, as recited in claim 7, wherein the instructions are placed inside of n respective beacons within the n consecutive superframes.

9. A method of controlling a transmitter and a receiver to adjust transmitting and receiving times in a superframe having a plurality of active time slots and one or more unassigned time intervals, as recited in claim 1, wherein the transmitter and receiver are ultrawide bandwidth devices.

10. A method of controlling a transmitter and a receiver to adjust transmitting and receiving times in a superframe having a plurality of active time slots and one or more unassigned time intervals, as recited in claim 1, wherein n is between 1 and 8.

11. A method of controlling a transmitter and a receiver to adjust transmitting and receiving times in a superframe having a plurality of active time slots and one or more unassigned time intervals, as recited in claim 1, wherein n is 4.

12. A method of controlling a transmitter and a receiver to adjust transmitting and receiving times in superframes having a plurality of active time slots and one or more unassigned time intervals, the transmitter and the receiver both being initially assigned to a staffing time slot chosen from the plurality of active time slots, comprising:

sending instructions from a controller to both the transmitter and the receiver during a first superframe, the instructions instructing the transmitter to transmit signals during an ending time slot formed in the one or more unassigned time intervals;

receiving the instructions at the transmitter during the first superframe;

transmitting the signals from the transmitter during the ending time slot in n consecutive superframes after the first superframe; and listening for the signals at the receiver during all of the active time slots and unassigned time intervals during at least one of the n consecutive superframes, wherein n is an integer greater than zero.

13. A method of controlling a transmitter and a receiver to adjust transmitting and receiving times in a superframe having a plurality of active time slots and one or more unassigned time intervals, as recited in claim 12, further comprising:

receiving the instructions at the receiver during one of the n consecutive superframes; and listening for the signals at the receiver during both the starting active time slot and the ending active time slot during at least one of the n consecutive superframes after the first superframe.

14. A method of controlling a transmitter and a receiver to adjust transmitting and receiving times in a superframe having a plurality of active time slots and one or more unassigned time intervals, as recited in claim 12, wherein the transmitter and receiver are ultrawide bandwidth devices.

15. A method of controlling a receiver in a wireless network using superframes having a plurality of active time slots and one or more unassigned time intervals, the receiver being initially assigned to a staffing time slot chosen from the plurality of active time slots, comprising:

receiving instructions from a controller at the receiver in a first superframe, the instructions instructing the receiver to receive signals during an ending time slot formed in the one or more unassigned time intervals; and listening for the signals at the receiver during both the staffing time slot and the ending time slot during n consecutive superframes after the first superframe, wherein n is an integer greater than zero.

16. A method of controlling a receiver in a wireless network using superframes having a plurality of active time slots and one or more unassigned time intervals, as recited in claim 15, wherein n is between 1 and 8.

17. A method of controlling a receiver in a wireless network using superframes having a plurality of active time slots and one or more unassigned time intervals, as recited in claim 15, wherein n is 4.

18. A method of controlling a transmitter in a wireless network using superframes having a plurality of active time slots and one or more unassigned time intervals, the transmitter being initially assigned to a staffing time slot chosen from the plurality of active time slots, comprising:

determining whether the transmitter received instructions from a controller in a first superframe, the instructions instructing the transmitter to transmit signals during an ending time slot formed in one of the one or more unassigned time intervals;

transmitting the signals during the ending time slot if the transmitter did receive the instructions in the first superframe; and transmitting the signals during the staffing time slot if the transmitter did not receive the instructions in the first superframe, and if the transmitter has not missed receiving previous instructions in m consecutive immediately previous superframes, wherein m is an integer greater than or equal to 3.

19. A method of controlling a transmitter in a wireless network using superframes having a plurality of active time slots and one or more unassigned time intervals, as recited in claim 18, further comprising entering an error mode if the transmitter did not receive the instructions in the first superframe, and if the transmitter has missed receiving previous instructions in m consecutive immediately previous superframes.

20. A method of controlling a transmitter in a wireless network using superframes having a plurality of active time slots and one or more unassigned time intervals, as recited in claim 18, wherein m is between 3 and 7.

21. A method of controlling a transmitter in a wireless network using superframes having a plurality of active time slots and one or more unassigned time intervals, as recited in claim 18, wherein m is 3.

22. A method of controlling a transmitter in a wireless network using superframes having a plurality of active time slots and one or more unassigned time intervals, as recited in claim 18, wherein the ending time slot is formed entirely in the one of the one or more unassigned time intervals.

* * * * *

UNITED STATES PATENT AND TRADEMARK OFFICE

CERTIFICATE OF CORRECTION

PATENT NO. : 7,593,422 B2
APPLICATION NO. : 10/639778
DATED : September 22, 2009
INVENTOR(S) : William M. Shvodian It is certified that error appears in the above-identified patent and that said Letters Patent is hereby corrected as shown below:

In the Claims:

Column 25, line 4, claim 1, please change “staffing active time slot” to be --starting active time slot--

Signed and Sealed this
Thirteenth Day of August, 2013

Teresa Stanek Rea
*Acting Director of the United States Patent and Trademark Office*